Figures 12, 13, 13A:
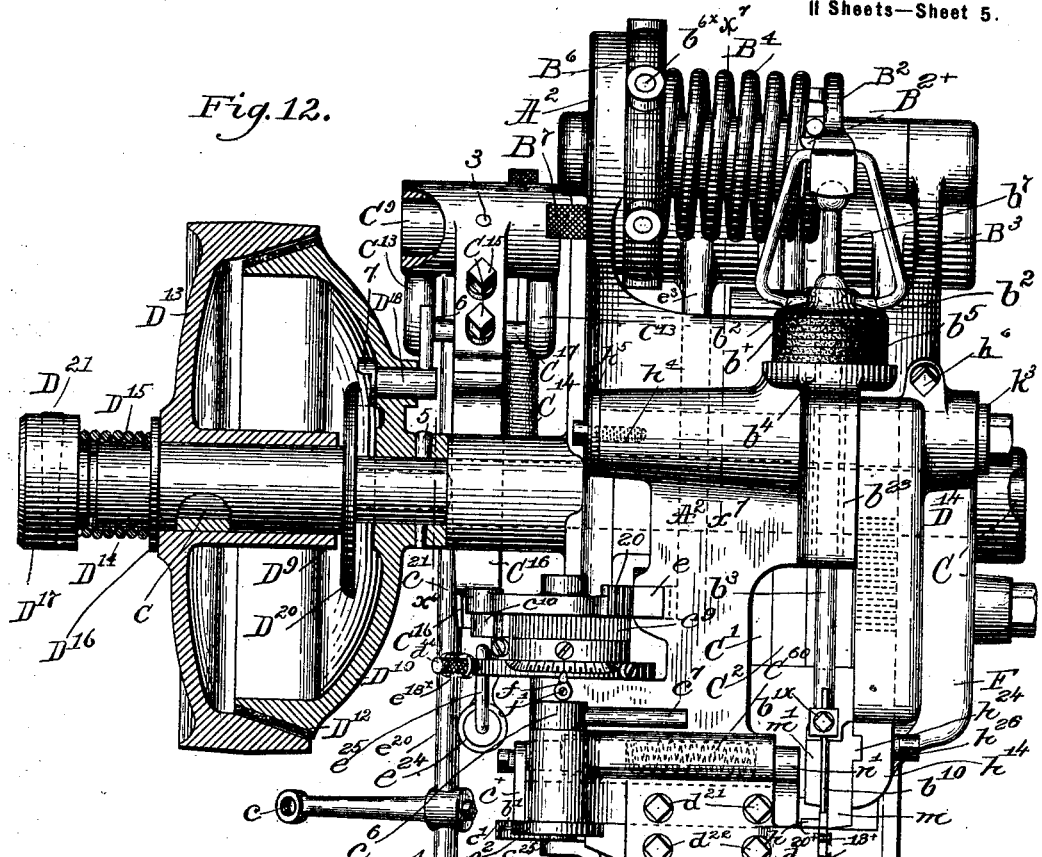

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 1.
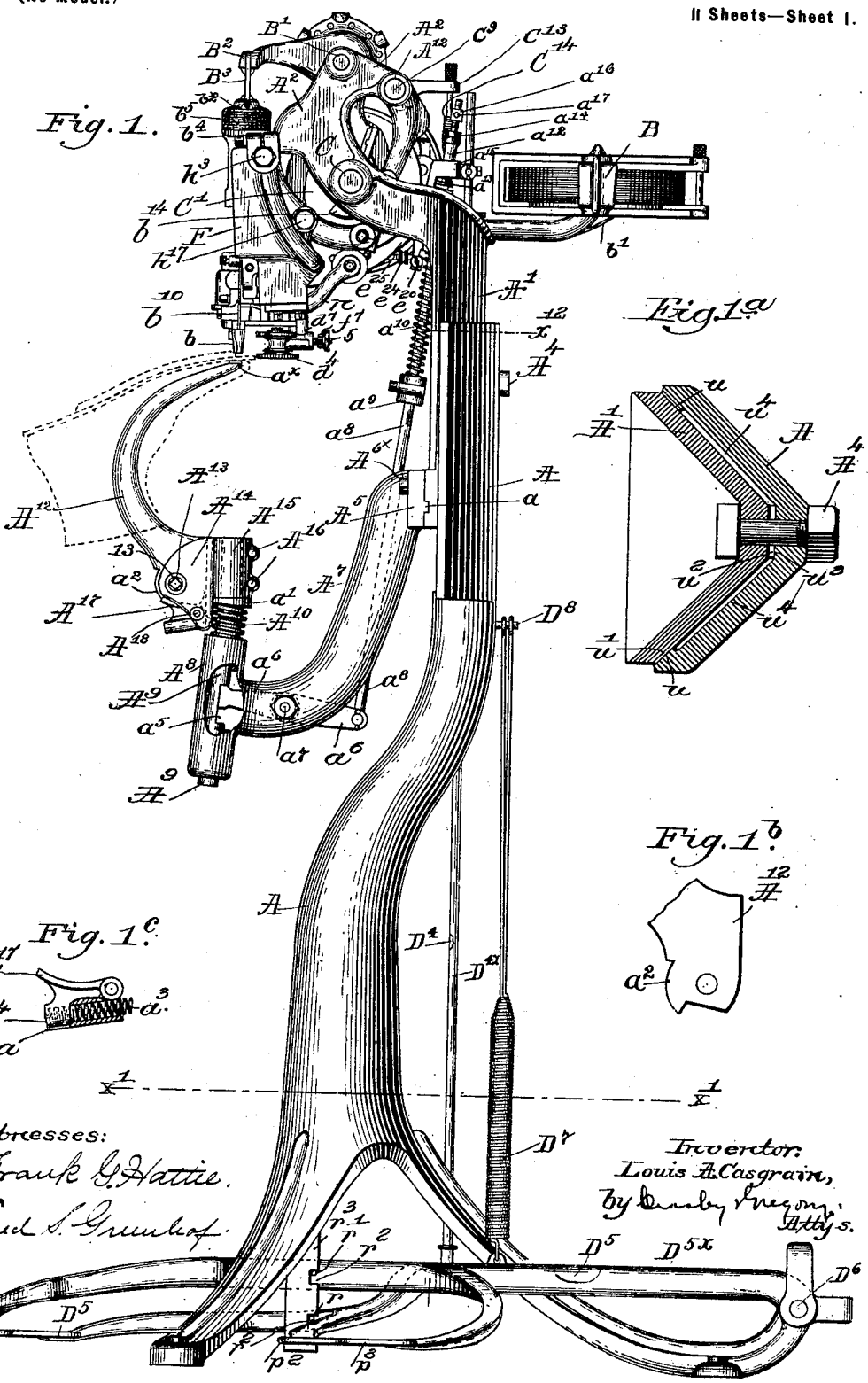

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 2.
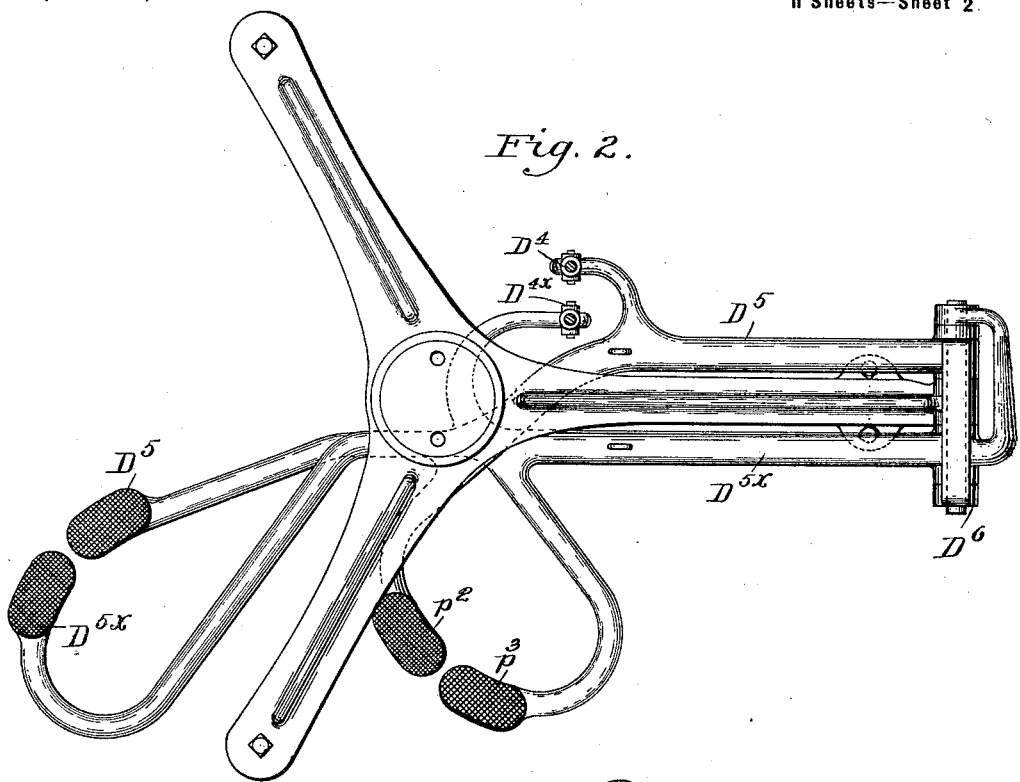
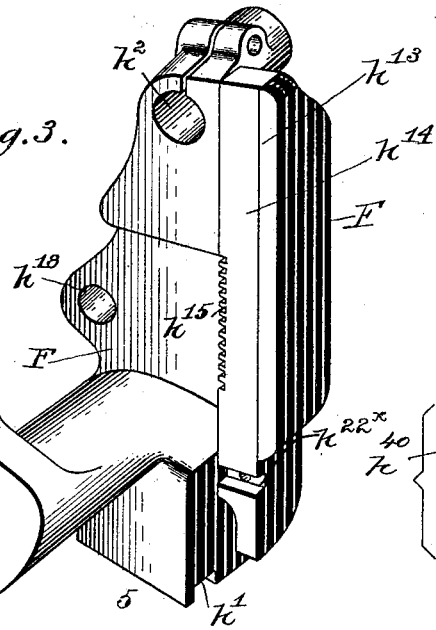
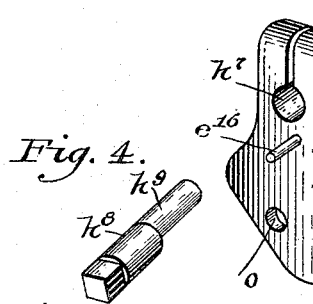
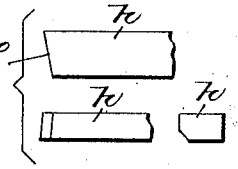
Witnesses:
Frank G. Hattie.
Fred S. Greenhof.
Inventor:
Louis A. Casgrain,
By Crosby Gregory
Attys
THE NORRIS PETERS CO., PHOTO-LITHO., WASHINGTON, D. C.

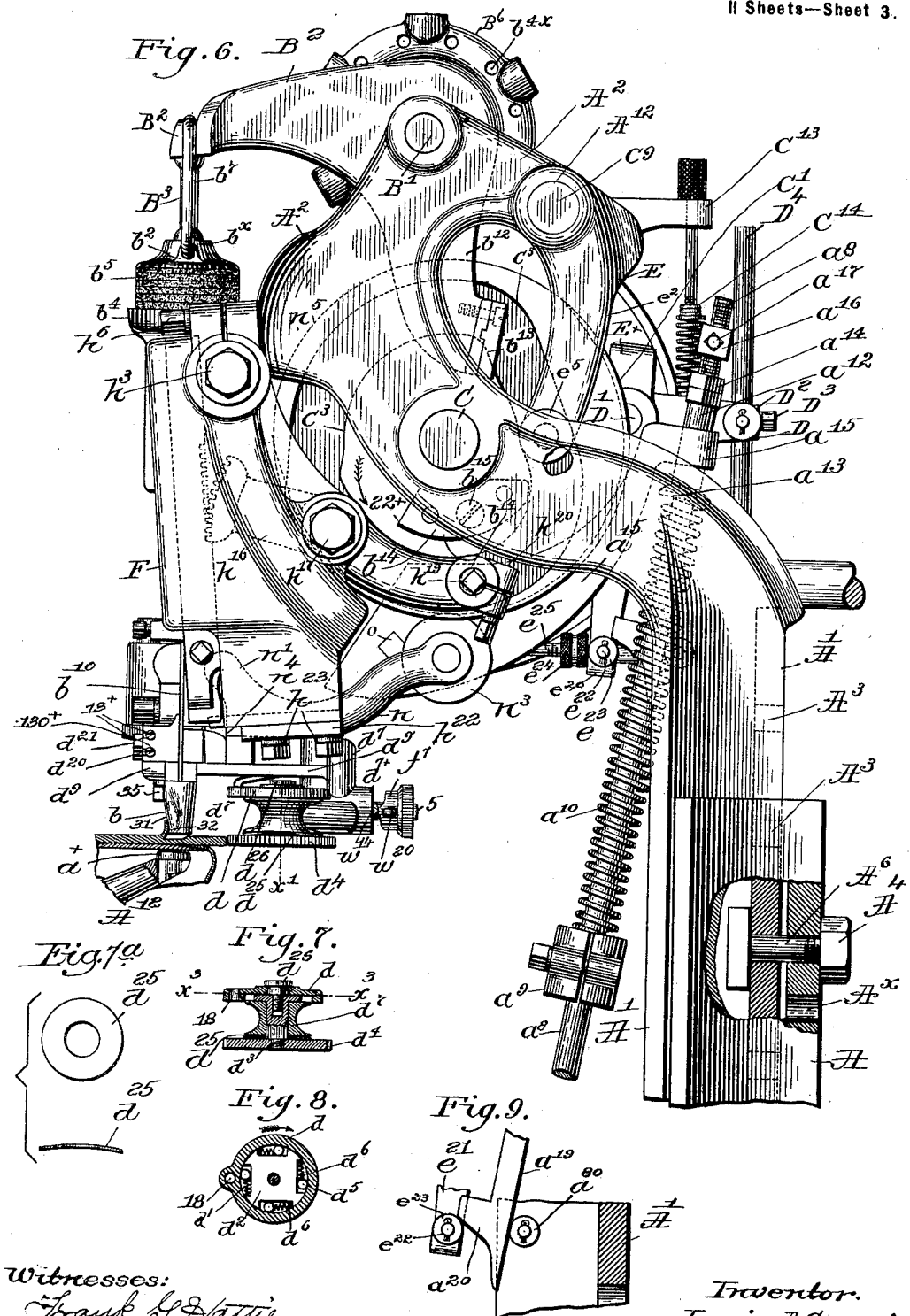

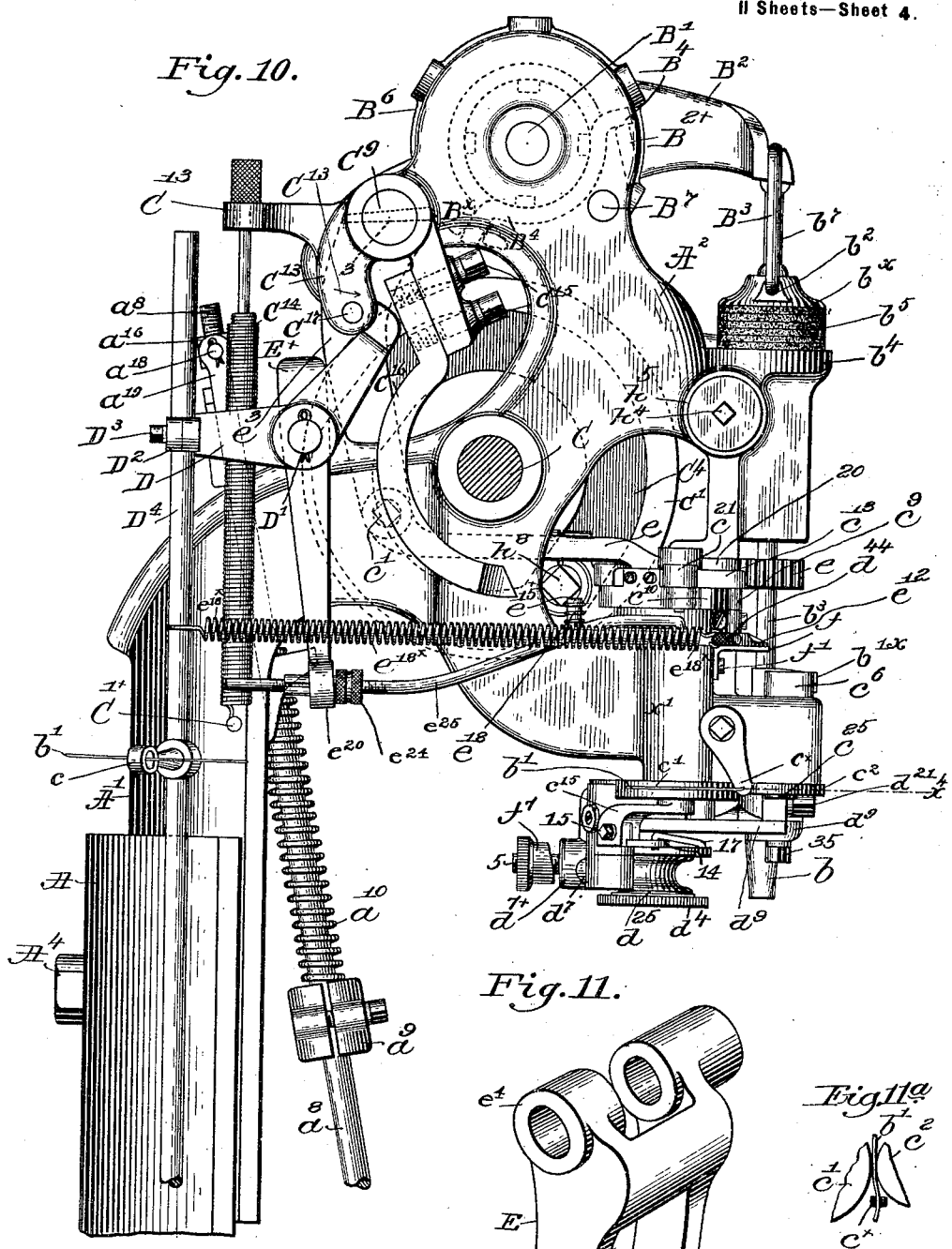

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 5.

Witnesses:
Frank G. Hattie.
Fred S. Greenleaf.

Inventor.
Louis A. Casgrain,
by Crosby & Gregory,
Atty's.

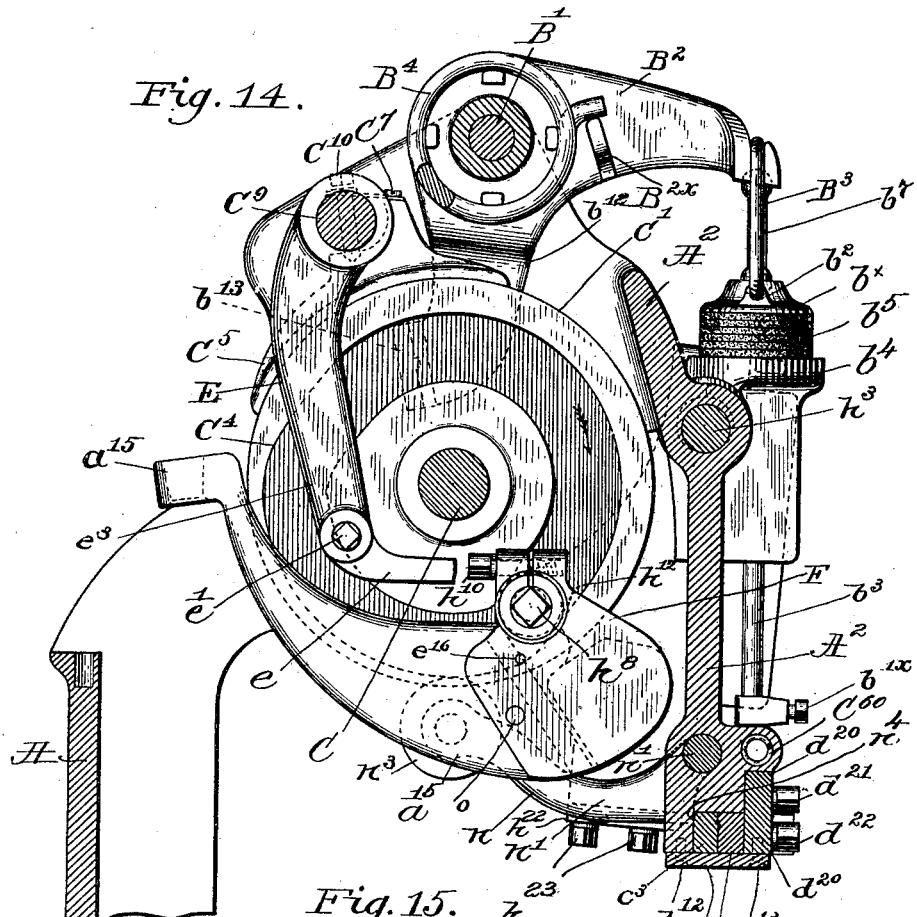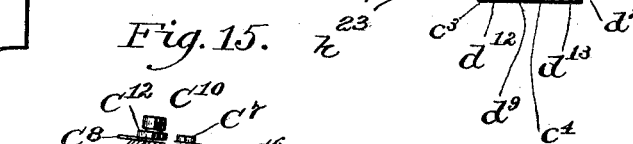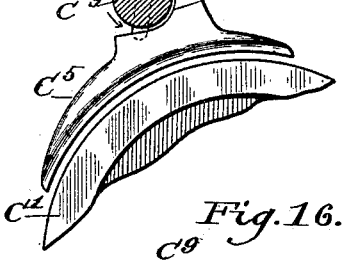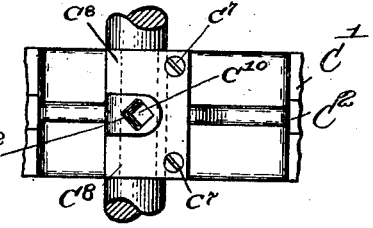

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 7.
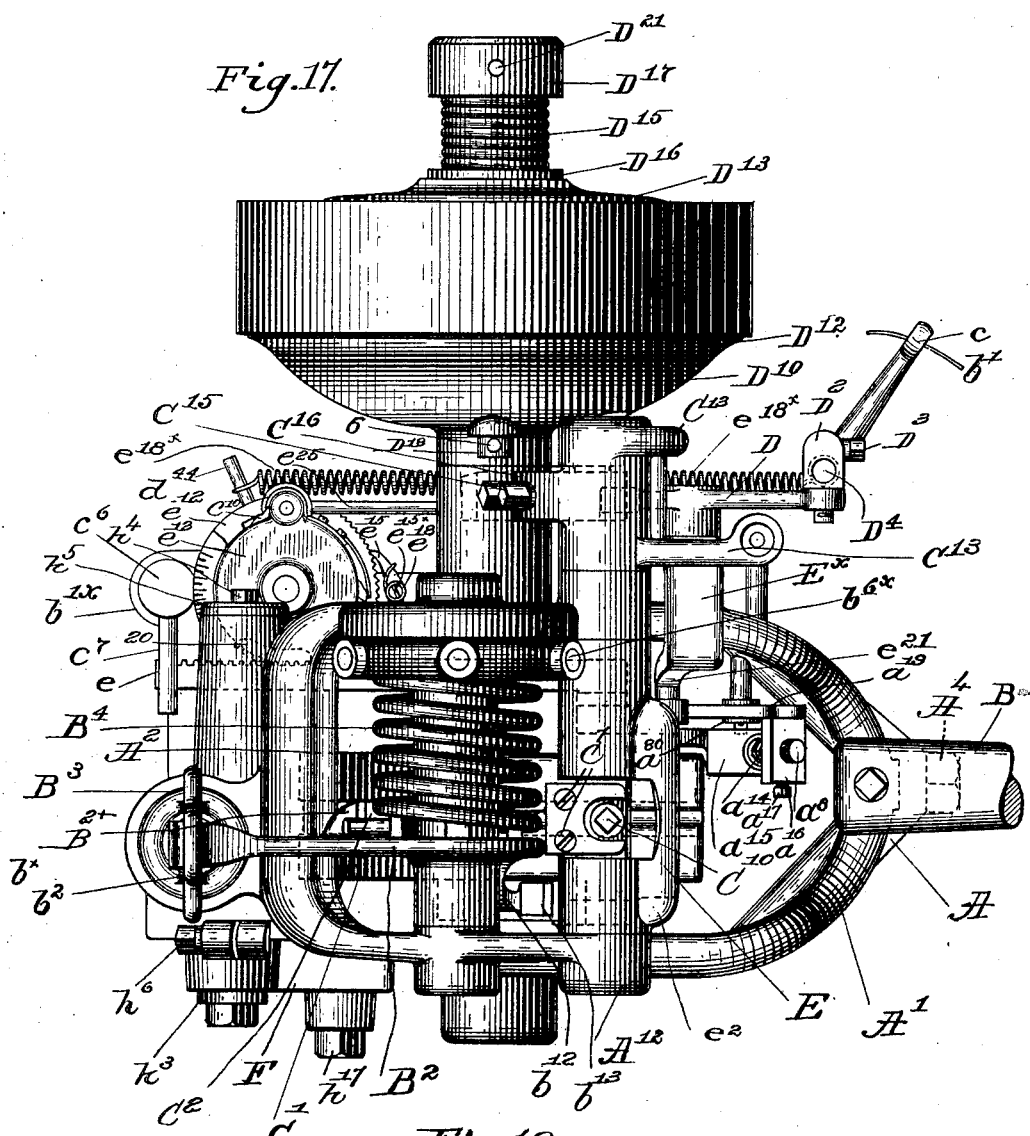
Witnesses:
Frank G. Hattie.
Fred S. Greenhof.
Inventor.
Louis A. Casgrain,
by Crosby Gregory
Atty's.

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 8.
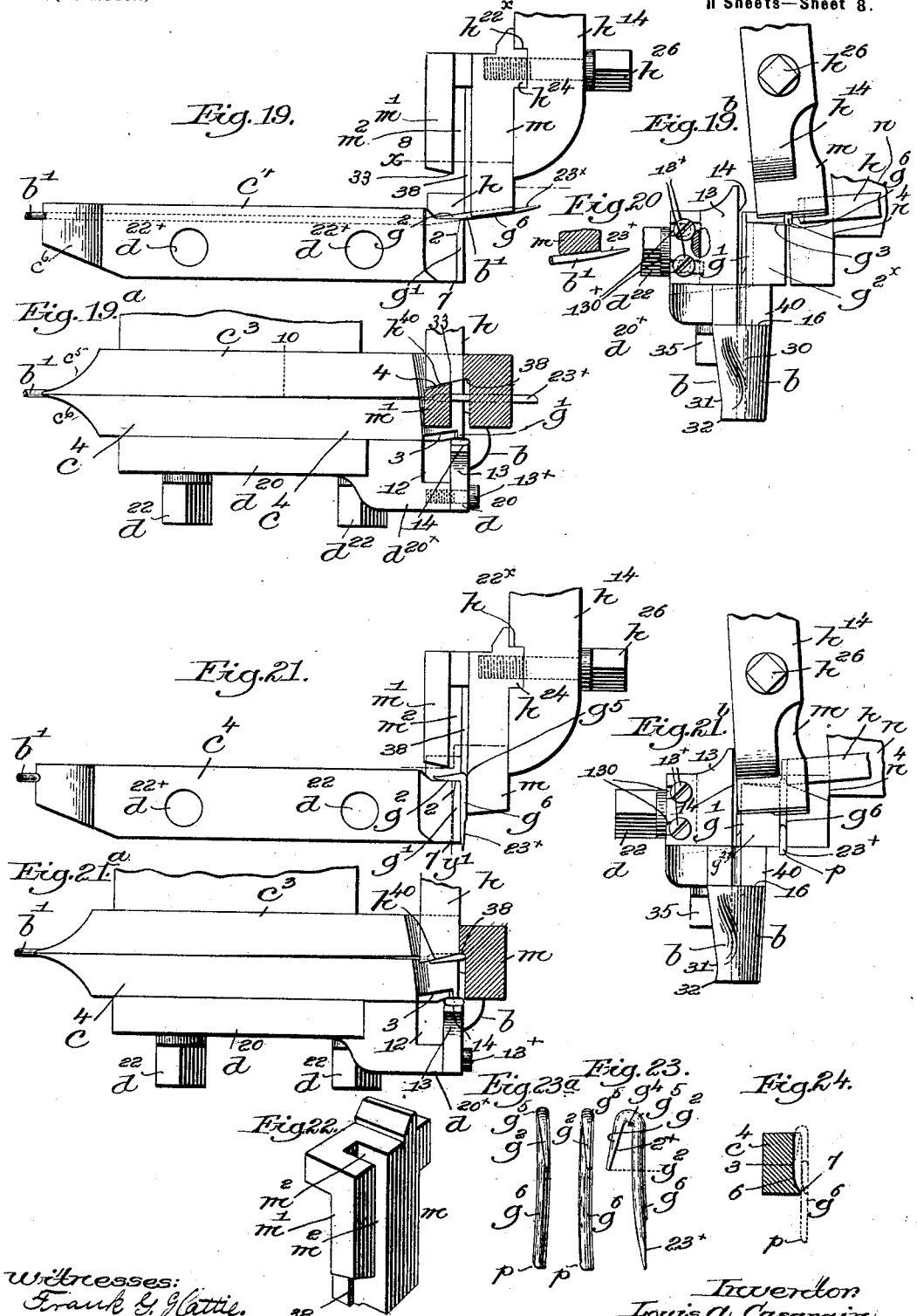

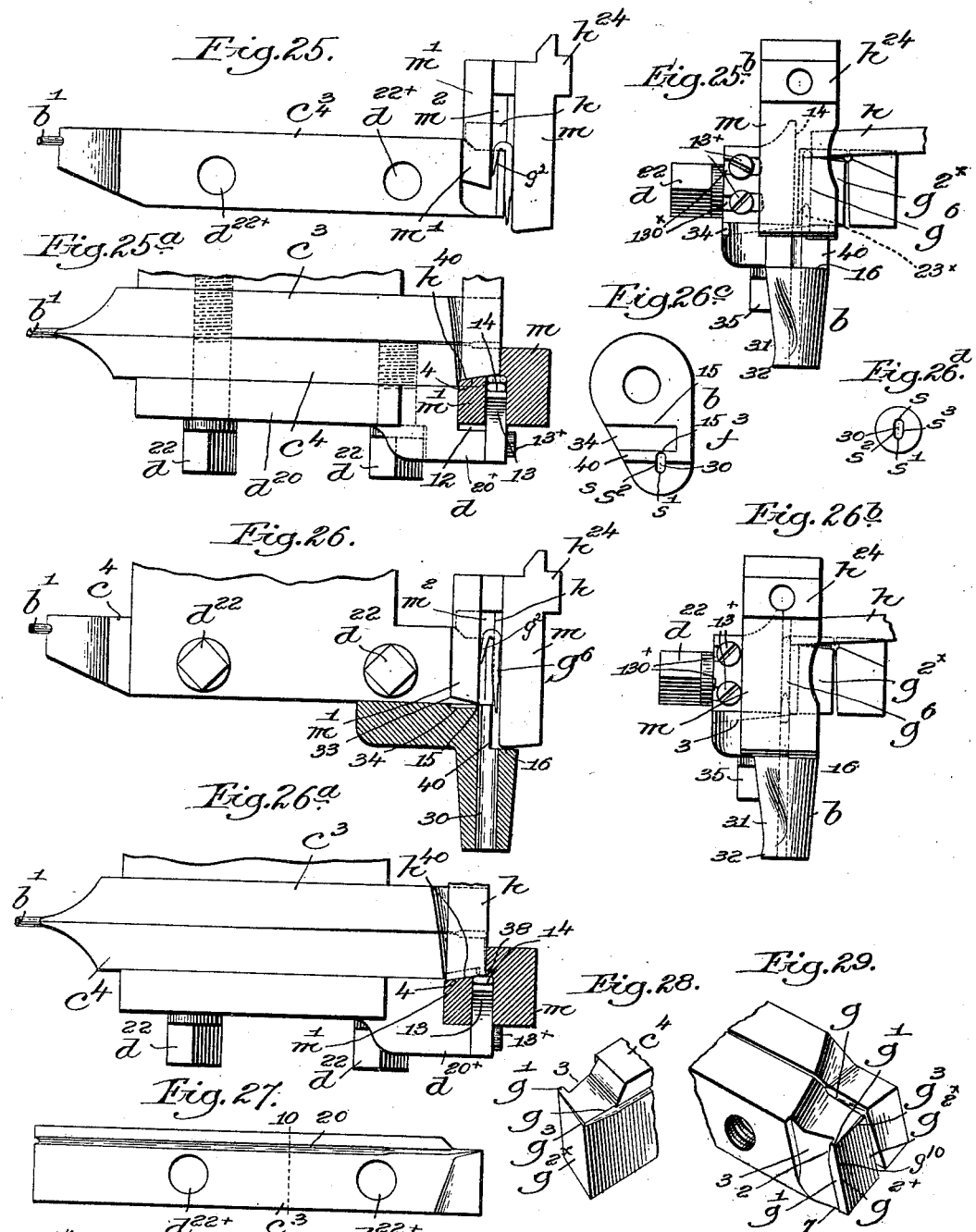

No. 669,023. Patented Feb. 26, 1901.
L. A. CASGRAIN.
MACHINE FOR MAKING AND INSERTING METALLIC FASTENINGS.
(Application filed Oct. 26, 1899.)
(No Model.) 11 Sheets—Sheet 10.
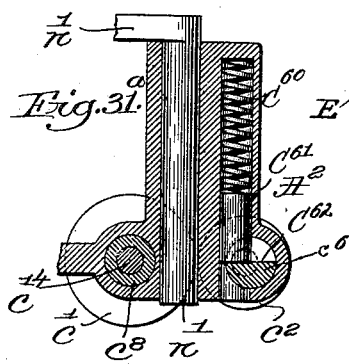
Fig. 31.
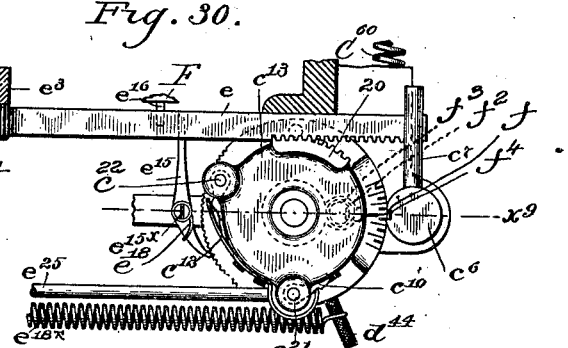
Fig. 30.
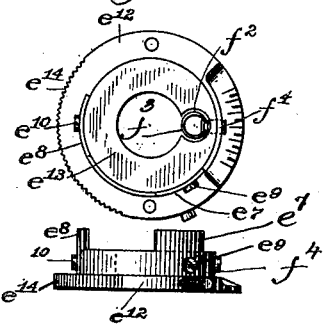
Fig. 32.
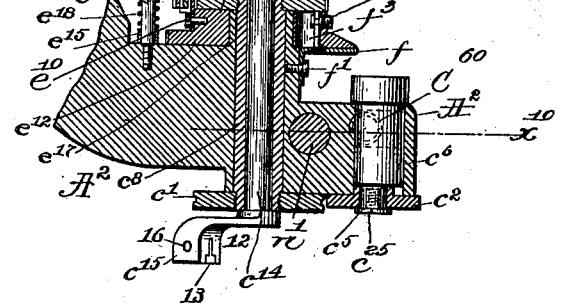
Fig. 31.
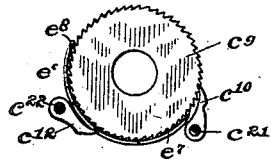
Fig. 33.
Fig. 35.
Fig. 36.ᵃ
Fig. 34.
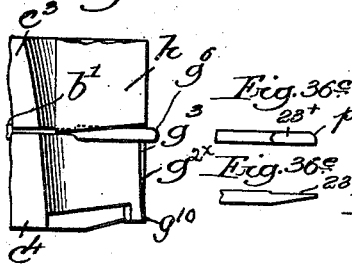
Fig. 36.ᵇ
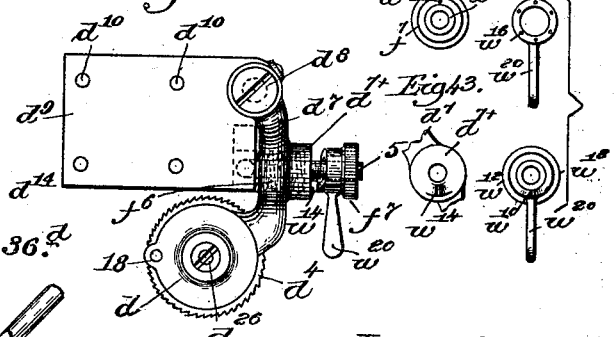
Fig. 36.
Fig. 36.ᵈ
Witnesses:
Frank G. Hattie.
Fred S. Greenleaf.
Inventor.
Louis A. Casgrain,
by Crosby Gregory
Atty's.

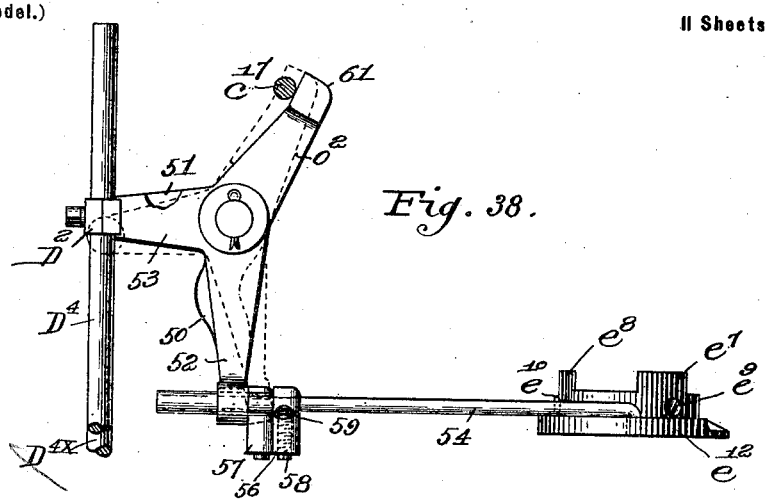

UNITED STATES PATENT OFFICE.

LOUIS A. CASGRAIN, OF WINCHESTER, MASSACHUSETTS, ASSIGNOR, BY MESNE ASSIGNMENTS, TO THE UNITED SHOE MACHINERY COMPANY, OF NEW JERSEY.

MACHINE FOR MAKING AND INSERTING METALLIC FASTENINGS.

SPECIFICATION forming part of Letters Patent No. 669,023, dated February 26, 1901.

Application filed October 26, 1899. Serial No. 734,828. (No model.)

*To all whom it may concern:*

Be it known that I, LOUIS A. CASGRAIN, a citizen of the United States, residing at Winchester, in the county of Middlesex and State of Massachusetts, have invented an Improvement in Machines for Making and Inserting Metallic Fastenings, of which the following description, in connection with the accompanying drawings, is a specification, like characters on the drawings representing like parts.

My invention consists of a new machine for making and inserting a new fastening formed from a continuous wire for uniting layers of material, such as the soles of boots or shoes. Not only is the machine new, but there are also embodied in the machine many novel devices and combinations of mechanism, which also form part of my invention. The fastening formed and driven by this machine has a head with a depending point, and when the fastening is driven this depending point enters the stock and the head is seated, effectually preventing any further movement of the fastening into the stock and insuring a uniform presentation of the heads. Also the point of the fastening is clenched on a horn and turned upward toward the depending head, and this prevents any outward movement of the fastening, and in this way I give to the fastening formed and driven by this machine a double clench—that is, when the fastening is driven, both head and point are clenched and all movement of the fastening in either direction is prevented.

My fastening thus consists when it is set or inserted in the stock of a single strand of wire, constituting the shank of the fastening, having hook-shaped ends entering and embedded in opposite sides of the material. On account of the hook-shaped ends this fastening has a great holding power and at the same time it is possible by reason of the hook-shaped ends to use much smaller wire than could otherwise be used, so that there is much less interference with the flexibility of the stock than is the case with other metallic fastenings.

My novel machine contains a guideway through which the fastening material is fed for the desired length or for a greater or less distance, according to the thickness of the material to be united, and while the said fastening material is held in or at the end of said guideway said material is acted upon by a shaper, which bends the material and defines the length of the body or shank of the fastening, including its point, and the fastening material so bent is then acted upon by a suitable shear or cutting mechanism which severs the fastening material, preferably diagonally back of the bend made by the shaper, leaving a blank consisting of a shank, and a tapered portion to be subsequently bent to form a head for the fastening. In the further operation of the machine a bender acts upon the short end of the wire extended from the shank and bends it over an anvil, thus completing the head and presenting a novel fastening comprising a shank of the desired length and a hook-shaped head having a short depending point extending at an angle to the shank. The fastening so formed may then be removed from the anvil, and deposited in a driver-passage preparatory to the descent of a driver to act upon and drive it through a passage in a suitable nose or foot plate adapted to bear upon the surface of the stock sustained in any suitable manner, preferably by a horn. The fastening while being driven from the nose or foot plate by the driver is guided and directed in its passage into the stock by the frictional contact of the hook-shaped head of the fastening with the walls of the driver-passage, said walls retaining the fastening in the condition of bending while being driven.

The wire of which the fastening is made is preferably curved, so that the shank of the fastening presents a curve, and the point of the shank is preferably tapered and also slightly beveled at one edge, said curve and bevel being utilized to control the direction of movement of the shank of the fastening as it is being driven through the stock, the shank being so directed as to always insure that its point may correctly enter the inner sole of the shoe.

A fastening having a head of the kind described may be made of comparatively light material—that is, of a wire much smaller in diameter than would be required to form an upset head which would contact with the stock for a distance equal to the part spanned by the bent head of my improved fastening, and so by reason of the shape of the fastening and the manner in which it engages the stock it is possible to separate the fastenings farther when being driven than is the case with an ordinary fastening, thereby lessening the tendency to stiffen the sole, and yet the fastening will hold the material firmly, the depending point of the head aiding very materially in effecting this object.

Different features of my invention will be hereinafter fully described, and pointed out in the claims at the end of the specification.

Figure 1 represents a right-hand side elevation of a machine embodying my invention. Fig. $1^a$ is an enlarged section of Fig. 1 in the dotted line $x^{12}$. Fig. $1^b$ is a detail showing the lower end of the horn $A^{12}$. Fig. $1^c$ is a detail of the latch coöperating with the horn. Fig. 2 is a section below the line $x'$, Fig. 1. Fig. 3 is an enlarged view showing the carriage and its slide-bar for carrying the shaping device and bender and the movable member of the cutting means. Fig. 4 represents the eccentric stud $h^8$ detached. Fig. 5 represents the cutter $h$ in three views detached from the groove represented at the lower end of Fig. 3. Fig. 6, enlarged, represents the upper right-hand side of the machine shown in Fig. 1. Fig. 7 is a sectional detail in the line $x^2$, Fig. 6; Fig. $7^a$, a detail showing in two views the washer coöperating with the shoe-feeding wheel. Fig. 8 is a section in the line $x^3$, Fig. 7. Fig. 9 is a detail representing part of a length-regulating device. Fig. 10 is a left-hand side view, on a larger scale, of the upper part of the machine represented in Fig. 1. Fig. 11 is a detail of the main lever E on a larger scale than Fig. 1. Fig. $11^a$ is a partial sectional detail in the dotted line $x^4$ shown on the feed-roll $c^2$, Fig. 10. Fig. 12 is a front elevation of the upper end of the machine represented in Fig. 1 on a larger scale than Fig. 1, the clutch-pulleys being represented in section. Fig. 13 is a section in the line $x^6$, Fig. 12, looking to the left. Fig. $13^a$ is a partial vertical section taken in the longitudinal center of the driver-bar chiefly to show the bushing in which the driver-bar works and the cushion coöperating with the driver to arrest the same at the end of its downstroke. Fig. 14 is a section in the line $x^7$, Fig. 12. Figs. 15 and 16 are details of the brake to stop the machine at a defined position. Fig. 17 is a top or plan view of Fig. 6. Fig. 18 is a detail showing several thicknesses of material which have been united by my improved fastening. Figs. 19, $19^a$, and $19^b$ are details showing the wire-guideway, the shaper, the bender, the cutter, and the anvil in their normal positions, the wire having been fed through the guideway for the proper length to make a fastening having a shank of the desired length. Fig. 20 is a detail showing part of the lower end of the shaper and the wire in contact therewith. Figs. 21, $21^a$, and $21^b$ show the wire-guideway, the shaper, bender, and cutter, the latter being in the position about to finally sever the wire for the fastening from the main body of the wire. Fig. 22 is a detail showing the shaper and bender detached from the slide-bar. Fig. 23 is a detail showing one of my improved fastenings in two different positions. Fig. $23^a$ shows the curve in the shank put in by the curving device opposite to the curve shown in Fig. 23. Fig. 24 is a detail in the line $y'$, Fig. 21, to show the shape of the groove left after forming the anvil. Figs. 25, $25^a$, and $25^b$ are different views showing the wire-guideway, the shaper, bender, cutter, and anvil in the position they will occupy when the head of the fastening is fully formed. Figs. 26, $26^a$, and $26^b$ show the same parts in the position they will occupy when the fastening has been removed from the anvil and is in position to be struck by the driver to be driven through the nose. Fig. $26^c$ shows the top of the upper end of the nose and the passage therethrough. Fig. $26^d$ shows the under side of the nose. Fig. 27 is a detail showing an inner side view of the inner part of the guideway for the fastening material. Fig. 28 shows the inner side of the delivery end of the outer part of the wire-guideway. Fig. 29 is a perspective view showing both ends of the wire-guideway to represent distinctly the cutting edge of the stationary cutting member and the anvil. Fig. 30 is a detail showing in plan view the regulating means for controlling the length of fastening material used in the formation of each fastening. Fig. 31 is a section in the line $x^9$, Fig. 30. Fig. $31^a$ is a section in the line $x^{10}$, Fig. 31. Fig. 32 is a plan view of the device instrumental in varying automatically the length of the wire to be fed through the guideway for the production of a fastener. Fig. 33 is a detail showing the ratchet-wheel of the feeding mechanism, the movable pawl-carrier coöperating therewith, and a plurality of pawls, said pawls being mounted upon studs shown in section, the pawls depending from a pawl-carrier. Fig. 34 is an edge view of the ratchet-wheel $c^9$. Fig. 35 is a detail representing part of the pawl-carrier $c^{13}$ and one of the studs. Fig. 36 shows the plate $d^9$ detached, together with the lever $d^7$, carrying the shoe-feeding device. Fig. $36^a$ shows the wire-curver $c^\times$ detached. Fig. $36^b$ shows an enlarged top view of the upper side of the plates of the wire-guideway and part of the movable wire-cutting member coöperating with the part of the wire exposed behind the delivery end of the said guideway, said wire being in position to be severed against the stationary cutter member, the dotted line crossing the wire showing the shape that the end of the wire left in the guideway after severing the same will assume, such end constituting the tapered point of the shank or body of the next fastening to be made. Fig. 36ᶜ shows the point left at the end of the wire after the fastening is severed. Fig. 36ᵈ shows, enlarged, the end of the wire as it will appear when severed diagonally, further illustrating what is herein designated as the "tapered" and "beveled" point of the fastening to be described. Fig. 36ᵉ is an elevation of Fig. 36ᶜ. Fig. 37 shows the lever Eˣ. Fig. 37ᵃ represents the lever D detached. Figs. 38, 39, and 40 show a modification to be referred to, whereby the automatic measurement of the length of the fastening may be suspended and fastenings of two different lengths be inserted, as may be desired. Fig. 41 is an inner side view of the nut $f^7$; Fig. 42, two views of the lever $w^{20}$, and Fig. 43 a detail showing the face of the hub $d^{7\times}$.

Referring to the drawings, A represents a peculiar-shaped column having suitable feet to stand upon the floor, the upper end of said column being cast to present an open groove substantially V-shaped in cross-section, said groove receiving in it a substantially V-shaped shank A' of a head A² of suitable shape to sustain the different working parts to be described, said shank in order that it may be adjusted vertically that the head may stand at different heights from the floor, according to the height of an operator, being provided with a suitable number of holes, as A³, (see Fig. 6, dotted lines,) through either of which may be extended a suitable clamping-bolt A⁶, the upper end of the column having, preferably, a plurality of holes in which the said bolt may be placed, one of said holes being represented by the letter Aˣ.

The lower end of the shank A' is provided, as represented, with a transverse groove (see Fig. 1) which receives a horizontal rib or projection $a$, extending from a plate A⁵, connected with the said shank by suitable set-screws A⁶ˣ. Said plate has depending from it an arm A⁷, provided, as represented, at its end with a sleeve A⁸, through which is extended a horn-spindle A⁹, herein represented as of peculiar shape—that is, the upper end of the horn-spindle presents its axis of rotation always substantially coincident with or parallel to the line of movement of the driver extended—and said spindle has applied to or forming part of it a collar $a'$, the part of the spindle below said collar being inclined with relation to the upper end of the spindle, said inclined end of the spindle entering the bore in the sleeve A⁸, which is also set at an inclination with relation to the line of movement of the driver. The object of this construction of the horn-spindle is to move the clenching-cavity in the tip of the horn slightly away from the line of movement of the driver as the material between the tip of the horn and the nose varies in thickness. This variation in location of the tip of the horn by inclining the shank of the horn-spindle is rendered necessary by the fact that owing to the peculiar shape of the fastening, which has a slight bevel on one edge of the flattened or tapered point 23ˣ of its shank $g^6$, as at $p$, Fig. 36ᶜ, the edge nearer the column as the fastening is driven, the shank of the fastening as it is being driven is slightly inclined away from the column, thereby insuring that the nail shall in its passage through the material properly penetrate the inner sole and not run off into the upper. As a result of this inclination of the horn-spindle with relation to the line of movement of the driver the horn as it moves downward gradually moves away from the line of movement of the driver, the path of movement of the clenching-cavity always being in a line at an angle to the line of movement of the driver and parallel with the inclined horn-spindle, so that the clenching-cavity is always in proper position to clench the point of the inclined fastening, whatever the thickness of the stock.

The horn-spindle A⁹ is supported in a yielding manner between the top of the sleeve and the collar $a'$ by means of a suitable spring A¹⁰.

The horn A¹² is represented as pivoted upon a stud A¹³, extended through suitable ears A¹⁴ of a split hub A¹⁵, herein represented as clamped upon the upper end of the horn-spindle by suitable clamp-screws A¹⁶. The lower end of the horn is made substantially circular at $a^2$, and said circular portion is provided with a notch, (see Fig. 1ᵇ,) which is adapted to be engaged by a suitable latch A¹⁷, mounted upon an eccentric stud-screw A¹⁸, said latch receiving in a tubular portion $a$ thereof at its lower end (see Fig. 1ᶜ) a spring $a^3$, which is regulated as to its pressure by a set-screw $a^4$, said spring acting against a fixed part of the sleeve and normally serving to keep the latch in its operative position to engage the shoulder of the horn whenever the latter (the work having been applied to it) is turned into working position. The upper end of the horn is split (see Fig. 6) and receives within it the shank of a cup-shaped point-clenching device $a^\times$ of usual construction.

The spindle A⁹ is notched at $a^5$ to receive the smaller end of a horn-depressing lever $a^6$, pivoted at $a^7$, said lever having a connected rod $a^8$, which is extended upwardly through a collar $a^9$, fixed on said rod, and thence through the horn-elevating spring $a^{10}$ and thence through a sleeve $a^{12}$, applied loosely to the rod and having at its lower end a flange $a^{13}$, said flange being supported by the spring. The upward movement of the spring-pressed sleeve is limited by the nut $a^{14}$, screwed upon a threaded part of the upper end of the rod $a^8$. The sleeve $a^{12}$ and the rod within it are extended loosely through a hole in a lever $a^{15}$, connected to and movable with the carriage F, to be described, the flange $a^{13}$ of the sleeve contacting with the under side of the end of said lever when the stock on the horn is under pressure. The upper end of the rod $a^8$ has adjustably applied to it a block $a^{16}$, the position of the block on the rod being adjusted by turning the block on the threaded upper end of the rod, the block being confined in its adjusted position by means of a suitable clamp-screw $a^{17}$. The block $a^{16}$ (see Fig. 10) has at its inner side a stud $a^{18}$, on which is pivoted a controlling device $a^{19}$, free to slide over a roller $a^{80}$. The lower end of the controlling device is represented in detail in Fig. 9 in substantially its lowest position, as when the thinnest stock to be nailed is in position between the tip of the horn and the nose or foot plate, to be described.

Viewing Fig. 1, the lever $a^6$ is shown as operating against the shoulder at the upper end of the slot $a^5$ in the horn-spindle. The horn-spindle and horn are elevated, and the horn clamps the stock between itself and the nose or foot plate $b$. When the stock is being fed, as will be described, the lever $a^6$ is turned away from the upper shoulder of the notch $a^5$, letting the horn descend to adapt itself to the required thickness of stock upon it, the spring $A^{10}$, which is merely a counterbalance for the horn, yielding at such time as may be necessary. The wire or like material $b'$ (see Fig. 1) may be contained on a suitable reel B, as represented at the right in Fig. 1, the axis of rotation of the reel being preferably vertical, the wire being delivered from the inside of the reel in usual manner.

The head $A^2$ has at its upper end a suitable stud $B'$, which supports a driver-actuating lever $B^2$, the forward end of which receives over it a substantially V-shaped bail or link $B^3$, one end of said bail being seated in a notch at the free end of said lever, the projections at the lower end of the link, made, preferably, of spring-wire, entering suitable notches in the ears $b^2$ on a collar $b^\times$, loose on the driver-bar $b^3$, but held by the link against the taper head $b^{20}$ of the driver-bar. (See Fig. 13$^a$.) This construction is much more economical than what has hitherto been used, and in connection with the link and the ball-ended stud, hereinafter referred to, it forms a very satisfactory connection between the driver-bar and its actuating mechanism. This collar $b^\times$ acts upon a suitable washer or cushion $b^5$, interposed between it and the shoulder $q^4$ of the head, which deadens the blow against the framework caused by the descent of the driver-bar. The downward movement of the driver is caused through lever $B^2$ by a spring $B^4$, surrounding a sleeve-like hub of said lever and acting against one end of a stop $B^{2\times}$ of said lever, (see Fig. 14,) the opposite end of the spring abutting against a shoulder $B^\times$ (see Fig. 10) of a plate $B^6$, rotatable about the stud $B'$ and adapted to be held in any of the positions in which it may be put in adjusting said spring by means of a suitable pin $B^7$, carried by the head, the inner end of the pin entering one or the other of a series of holes, as $b^{4\times}$, in the plate, the plate being rotatable by inserting a suitable lever in a hole or holes, as $b^{6\times}$, made in bosses at the periphery of the plate $B^6$. The hole in collar $b^\times$ through which the driver-bar passes is beveled for a portion of its length (see Fig. 13$^a$) to correspond with the bevel of the head of the driver-bar; but the lower portion of the hole—that is, the part of it which is below the head of the driver-bar—is, as herein shown, formed with a straight circular wall $b^{21}$, thus leaving a circular opening $b^{22}$ between the driver-bar and the collar below the head of the driver-bar. The object of this circular opening is to receive the end of the bushing $b^{23}$, which as the leather cushion wears away will protrude more or less above the cushion.

It is not of course essential that the portion of the hole in the collar below the head of the driver-bar be straight—as, for instance, the hole in the collar may be beveled for its entire length, but of such a size that the head of the driver-bar will only go part way through. Any construction which would leave an opening for the protruding bushing would be within my invention.

I apply between the free end of the lever $B^2$ and the upper end of the driver-bar and its collar $b^\times$ a suitable ball-ended stud $b^7$. The driver-bar at its lower end carries a suitable driver $b^{10}$, held therein by a suitable screw $b'^\times$ in any usual manner.

The driver-actuating lever $B^2$ is herein provided with an extension $b^{12}$, (see Fig. 6,) having preferably applied to it and clamped fixedly thereon a suitable steel block or wear-plate $b^{13}$, which is acted upon once during each rotation of the main shaft C of the machine by a lump $b^{14}$, (see full and dotted lines, Fig. 6,) attached by a screw $b^{15}$ to one side of a cam-block $C'$, carried by said shaft, (see Fig. 14,) said lump meeting the block $b^{13}$ and turning the lever $B^2$ in the direction to lift the driver-bar and compress its actuating-spring, the driver-bar being thrown down by said spring whenever the heel $22^\times$ of the lump passes the block $b^{13}$.

In nailing machines as hitherto constructed the leather cushion which is generally on such machines to deaden the blow of the driver has been placed around a bushing which was only of a length substantially the same as the thickness of the cushion, the sole object of the bushing being to keep the cushion away from the driver to prevent the cushion being carried up by the driver in its backward movement, and such bushing did not act as a bearing for the driver-bar.

In this machine I have for the first time used a long bushing which not only passes through the leather cushion, but also extends through the frame of the machine and forms the bearing for the driver-bar. This bushing is shown in dotted lines in Fig. 12 and in detail in Fig. 13$^a$. This construction is much more economical than that used heretofore in machines of this class. The main shaft C in the form in which I have herein represented it is provided with a single cam-block $C'$, the periphery of which is eccentric with relation to its center of rotation and is provided with a groove $C^2$, and said block at its right-hand side (as the operator faces the machine) is provided with a cam-groove $C^3$ and at its left-hand side with a cam-groove $C^4$. The eccentric periphery of the cam-block $C'$ has coöperating with it a brake-shoe $C^5$, which is made operative in stopping the machine at a defined point, (see Figs. 14 to 16,) said brake-shoe being notched at its upper side, as at $C^6$, and having connected with it by screws $C^7$ slotted spring-fingers $C^8$, which overlap a secant face of a rock-shaft $C^9$. Said face and the fingers of the springs are of such length and said springs are so seated upon said face that when the operator has his foot on the treadle to start the machine the rock-shaft acting on the springs will cause them to poise the brake so that both of its ends will be removed from the path in which the eccentric periphery of the cam-block travels. The springs resting on the shaft $C^9$ serve to support the weight of the brake and keep it in its inoperative position away from the periphery of the rotating cam-block when the machine is running. The shaft $C^9$ has applied in a threaded hole therein a screw $C^{10}$, said screw being also passed through a set-nut $C^{12}$, the lower end of said screw entering a small pit, (see Fig. 15,) made in a shouldered part of the upper side of the brake. The shaft $C^9$ is mounted loosely in suitable bearings in the head $A^2$, one of said bearings being shown at $A^{12}$, Fig. 6. This shaft has pinned to it by a pin 3, Fig. 12, the hub of a three-armed lever $C^{13}$, and when said shaft is turned in the direction of the arrow, Fig. 10, the end of the screw $C^{10}$ acts to move the brake-shoe toward the eccentric periphery of the cam-block $C'$, causing said brake to meet said eccentric portion and stop the machine at a definite point. The three-armed lever $C^{13}$ has connected to one of its arms by suitable set-screws $C^{15}$ a starting and stopping device $c^{16}$, shown as a curved arm. Said lever also carries a stud $C^{17}$. The lever $C^{13}$ to start the machine is moved by means of a suitable lever D, represented as of elbow shape, mounted loosely upon a stud $D'$ in the head $A^2$, the outer end of said lever being jointed to a stud carried by a block $D^2$, (see Fig. 6,) suitably clamped by a set-screw $D^3$ upon a rod $D^4$, connected at its lower end with a starting-treadle $D^5$, having its fulcrum at $D^6$, said treadle being normally upheld by a suitable spring $D^7$, connected therewith and with a stud $D^8$, extended from the column. When the operator puts his foot upon the treadle $D^5$ to depress it and start the machine, the inner upper end of the lever D meets the stud $C^{17}$ and turns the lever $C^{13}$, causing the starting-arm $C^{16}$ (see Fig. 10) to be moved away from the center of the cam-shaft C and release a pin $D^9$, (see Fig. 12,) carried by the fast pulley $D^{10}$, secured to said shaft by a pin 5. Said pulley $D^{10}$ has a conical clutch-face $D^{12}$, which enters a conical recess in the clutch-face of the loose pulley $D^{13}$, driven constantly by any usual belt from a continuously-moving counter-shaft. Said pin $D^9$ when released permits the spring $D^{14}$, surrounding a sleeve $D^{15}$, applied to the shaft C loosely, to expand and move said sleeve to the right, Fig. 12, causing the clutch-pulley $D^{13}$, running on said sleeve and acted upon at its outer side by a suitable collar $D^{16}$ of the sleeve, to be pushed in clutching contact with and pick up and carry with it the fast pulley and the shaft C.

Whenever the machine is to be stopped and the operator for that purpose removes his foot from the treadle, the spring $C^{14}$, connected at its lower end to a stud $C'^\times$, fixed on the shank $A'$ of the head, (see Fig. 10,) turns the lever $C^{13}$ and moves the starting and stopping arm $C^{16}$ toward the shaft C, putting the inclined face of said arm $C^{16}$ in the path of rotation of said sliding pin $D^9$, causing it to be slid by contact with said arm for a sufficient distance, when the cam-shaft shall arrive in just the position to be stopped, to force the sleeve $D^{15}$ and its collar $D^{16}$ in a direction to release the pressure or friction of the loose pulley $D^{13}$ from the fast pulley, so that the brake $C^5$, which then operates, may stop the machine in a defined position.

In case it is desired for any reason to turn the main shaft by hand, the operator, the sleeve $D^{15}$ and the loose and fast pulleys being in the position represented in Fig. 12, will engage a pin 6, extended from a stud $D^{18}$, mounted loosely in the fast pulley and having a suitable cam-lump 7, turning it from the position shown by full lines into the position shown by dotted lines, thus putting said lump 7 in contact with the flange $D^{20}$ at the inner end of said sleeve, keeping the two pulleys out of clutch, and then he may apply a suitable hand-wrench or spanner to the end of the pin $D^{21}$, used to secure the collar $D^{17}$ upon the shaft, and may turn the main shaft as desired.

The wire $b'$ may be led through a suitable guide-eye c, carried by the rod $D^4$ (see Fig. 10) and be led thence through a wire-curver $c^\times$, to be described, and between the feeding-roll $c'$ (see Fig. 31) and the pressure-roll $c^2$, said rolls turning about vertical centers and being actuated, as will be described, to feed the wire into and through a suitable groove 20, formed, as represented, between or at the inner sides of the two blocks $c^3$ and $c^4$, constituting a guideway for said wire or fastening material. The peripheries of the said feed-wheels work in the spaces $c^5$ $c^6$ (see Fig. 19) at one end of said blocks $c^3$ $c^4$, the block $c^3$ constituting the inner part and the block $c^4$ the outer part of the guideway. In making these blocks or parts, their contact-faces having been fitted throughout to touch accurately, I thereafter plane away the contact-face of one of them, herein shown as the inner part $c^3$, from about the dotted line 10, Figs. $19^a$ and 27, to its outer or right-hand end, viewing Fig. $19^a$, thus making a sort of rocker face or bed for the part $c^3$, thereby enabling the two faces when put together to have a little play one toward the other, and I utilize this play to enable the fastening material to be clamped in the grooves between the two parts $c^3 c^4$ and be held firmly, while the cutter $h$, to be described, acts to sever the wire diagonally in the formation of a fastening. Viewing Fig. 19$^a$, the faces at the right-hand side of the line 10 are separated, and the material is represented as unclamped and free to be moved longitudinally by the wire-feeding mechanism in the groove between the parts $c^3$ and $c^4$. The feeding-wheel $c'$ has preferably a slight groove in its periphery, which may be slightly scored to afford a more positive hold upon the wire. This scoring results in the wire being slightly corrugated as it passes between the feed-rolls. The pressure-roll $c^2$ is held by a screw $c^{25}$ on the eccentric end $c^5$ (see Fig. 31) of a headed stud $c^6$, mounted in a suitable bearing in a part of the head $A^2$, said stud having a handle $c^7$, Fig. 30, which may be engaged by the operator and turned whenever it is desired to remove the pressure-roll away from the feed-roll, such adjustment being especially useful when the operator is introducing the wire into the machine or when it is desired to stop the feeding of the wire for any reason.

A spiral spring $C^{60}$ (see Fig. 31$^a$) in an opening in the head or frame of the machine has bearing at one end against the head or frame and at the other end against a plunger $C^{61}$, which contacts with one side of a flattened portion $C^{62}$ of the eccentric stud $c^6$, said spring tending normally to turn the stud, so as to force the pressure-wheel $c^2$ toward the feed-wheel $c'$, and thereby the pressure of the wheel $c^2$ on the feed-wheel is always made uniform.

The feed-roll $c'$ is represented as screwed upon the end of a tube or sleeve $c^8$, passed through a suitable hole in the head, the upper end of said sleeve having fixed upon it a ratchet-wheel $c^9$, the teeth of which may be engaged by one or more pawls $c^{10} c^{12}$, each mounted on suitable studs $c^{21} c^{22}$, depending from a pawl-carrier $c^{13}$, shown as a disk pinned at $c^{13\times}$ (see Fig. 31) upon the upper end of a shaft $c^{14}$, having at its lower end an arm $c^{15}$, represented in Fig. 31 as split at 12, and having a groove or slot at 13, in which may be inserted an arm 14, (represented in Fig. 12,) said arm being made adjustable longitudinally in said slot and being clamped in adjusted position therein by means of a suitable clamp-screw 15, (see Fig. 10,) inserted through a hole 16 in said arm. The arm 14 has coöperating with it at one end a link or connection 17, which at its opposite end is connected in a hole 18 (see Figs. 7, 8, and 36) of a reciprocating disk-clutch $d$, having at its under side an annular chamber $d'$, which fits over the enlarged coöperating clutch-head $d^2$, connected with the upper end of a shaft $d^3$, mounted in an arm $d^7$, said shaft having suitably attached to its lower threaded end a shoe-feeding device $d^4$, represented as a wheel toothed at its periphery and adapted to bear against the edge of the sole of the shoe or other work and feed it over the horn when the latter is in its depressed position.

The clutch-disk $d$ is pivoted on the part $d^2$ by a stud-screw $d^{26}$, and the periphery of the head $d^2$ is notched, (see Fig. 8,) each notch receiving a roller $d^5$, which is acted upon by a suitable spring $d^6$, the space between the bottom of a notch of said head and the circular inner wall of the clutch-disk $d$ tapering, so that when the said clutch-disk is moved in the direction of the arrow thereon in Fig. 8 the rolls will be made to engage and move with it the head $d^2$, the shaft $d^3$, and its attached feed-wheel, thus moving the feed-wheel intermittingly step by step.

I interpose between the arms $d^7$ and the wheel $d^4$ a strong friction, as a washer $d^{25}$, so that the disk $d$ may be moved in the direction opposite the arrow, the rolls then occupying positions in the wider parts of the notches without turning the feed-wheel backwardly. The arm $d^7$, which, as above stated, carries shaft $d^3$, is shown in plan view in Fig. 36, said arm being pivoted on a stud-screw $d^8$, inserted in a cap-plate $d^9$, provided with suitable holes $d^{10}$ to receive suitable screws or bolts, as $d^{12}$, which pass through said holes and enter threaded holes in the head $A^2$, (see Fig. 14,) suitable screws $d^{13}$ entering the holes $d^{14}$ of said plate and holes in the block $d^{20}$, suitably held in position by bolts $d^{21}$ and $d^{22}$, the bolts $d^{21}$ entering suitable threaded holes in the head, while the bolts $d^{22}$ are extended through suitable holes $d^{22\times}$ in the parts $c^3$ and $c^4$ and enter suitably-threaded holes in the head, the block $d^{20}$ and the plate $d^9$ when in position affording a suitable space to receive between them and inclose the parts $c^3$ and $c^4$.

The pawl-carrier $c^{13}$ has a portion of its periphery toothed, as at 20, (see Fig. 30,) to be engaged by a slide-bar $e$, also represented as toothed, connected at one end with a stud $e'$, carried by a lever E, (shown detached in Fig. 11,) said lever having two arms $e^2 e^3$, the hub $e^4$ of said lever being mounted loosely upon the rock-shaft $C^9$. These arms $e^2$ and $e^3$ are of different length. The short arms $e^2$ of the lever E has a roller or other stud $e^5$, (shown by full and dotted lines in Fig. 6,) which enters the cam-groove $C^3$ in the cam-block $C'$, the end of the arm $e^3$ (better represented in Fig. 14) being connected with the rack-bar $e$, referred to. Said rack-bar and pawl-carrier $c^{13}$ have a uniform definite stroke; but the pawls $c^{10}$ and $c^{12}$ on the carrier will be effective to a greater or less degree in turning the ratchet-wheel $c^9$, according to the points at which they engage the ratchet-wheel. The pawls are made effective in their forward movement, always stopping at the same position; but they cannot engage the ratchet-wheel $c^9$ until they pass the shields $e^7 e^8$, connected, respectively, by screws $e^9 e^{10}$ with a feed-regulator $e^{12}$, having an upwardly-extended hub $e^{13}$, the screws entering holes in the hub, said screws being omitted in Fig. 33, because said figure merely shows the position of the shield about the ratchet-teeth. The regulator $e^{12}$ surrounds loosely a suitable boss $e^{17}$, erected upon the head $A^2$, (see Fig. 31,) and said regulator is provided with a series of locking-teeth $e^{14}$, (see Fig. 32,) which may be engaged at suitable times by a locking device $e^{15}$, shown in Fig. 30 as a spring-pressed pawl. Said locking device or pawl is struck at each operation of the machine and at a time when the stock is clamped between the horn and nose by a pin $e^{16}$, (see Fig. 3,) extended from the carriage F, said pin turning the pawl, releasing the regulating device, and permitting a spring $e^{18\times}$, connected with the regulator at one end and at its opposite end, as herein shown, to the rod $D^4$ to turn the regulator backwardly, taking with it the shields referred to. The position of the regulator is variable according to the varying positions of an arm $e^{20}$ of a two-armed lever $e^\times$, (see Fig. 37,) the other arm being herein represented at $e^{21}$, said arms being bored, as represented in said figure, to fit loosely over and turn on the stud D'. The end of the arm $e^{20}$ is bored (see Figs. 10 and 37) to receive an adjustable contact-piece $e^{24}$, carried by a rod $e^{25}$, connected with the regulating device $e^{12}$, and the arm $e^{21}$ has a stud $e^{22}$, (see Fig. 9,) provided, as represented, with a roller $e^{23}$, which at each operation of the machine is put or held by the spring $e^{18}$ in contact with the cam-surface $a^{30}$ of the controlling device $a^{19}$, hereinbefore described, the position of which with relation to said roller after each release of said locking device $e^{15}$ depends on the thickness of the stock between the horn or stock support and the nose $b$. By the change of position of the cam $a^{20}$ the position of the regulator will be changed automatically as the stock varies in thickness.

When the stock is thick, the shields must be moved backwardly farther with relation to the teeth of the toothed wheel $c^9$, forming part of the wire-feeding mechanism, than when the stock is thin, in order that the feeding-pawls $c^{10}$ and $c^{12}$ may engage said teeth sooner in the forward stroke, the position of the regulator under the control of the spring $e^{18}$ being determined, as stated, by the position of the arm $e^{21}$ of the lever $E^\times$, referred to.

The regulator for convenience may be provided with scale-marks, said scale-marks indicating lengths of fastenings to be made. A suitable pointer, as $f$, connected to the head $A^2$ by a screw $f'$, serves as a defining-point with relation to which the center of the regulator may be put by hand, according to the length of the fastening desired when starting the machine, but thereafter the regulator will be controlled in its movements entirely by the position of the cam-surface $a^{20}$, that depending upon the thickness of the stock.

I have shown the regulator as provided with a hole $f^2$, in which I may place a steel spring $f^3$, the upper end of which is shown in Fig. 32, said spring being represented in section in Fig. 31. The open slot of this spring is represented (see Fig. 31) as entering an annular groove in an adjusting-screw $f^4$, and by turning said screw the pressure of the spring against the hub $e^{17}$ may be increased or lessened in case it may be desired to produce more or less friction between the regulator and the hub, about which it turns. The annular groove in the screw by engaging the spring prevents the screw from escaping from the threaded hole in the regulator.

The lever or arm $d^7$, carrying the shoe-feeding wheel $d^4$, is provided with a hole which receives through it a screw-threaded rod 5, pivoted at its inner end to the plate $d^9$, and said rod inside the hub $d^{7\times}$ of the arm $d^7$ receives upon it a suitable spiral spring $f^6$, (shown by dotted lines, Fig. 36,) the end of the rod outside the arm receiving an adjusting-nut $f^7$, the position of which determines the position of the edge of the feeding-wheel and the distance from the edge of the sole at which the fastening shall be driven, this feed-wheel also constituting an edge gage. It is, however, sometimes desirable to change the point at which the fastenings are driven with relation to the edge of the sole, especially when inserting fastenings about the heel end of the sole, to thus insure the entrance of the fastenings in the heel end of the inner sole, and also at times it may be considered desirable in some classes of work to drive a second row of fastenings. I provide for this variation in operative position of the edge of the feeding-wheel $d^4$ with relation to the vertical line in which the driver moves by interposing between said nut $f^7$ and the hub of the arm $d^7$ a feeding-wheel-positioning device, it being herein represented as a lever having a series of graded cams, in this instance of my invention represented as three surfaces $w^{10}$ $w^{12}$ $w^{13}$, one or the other of said surfaces being held by the spring $f^6$ against a cam projection $w^{14}$, extended from the end of the hub $d^{7\times}$. (See Figs. 36 and 43.)

Fig. 36 shows the high part $w^{10}$ of the positioning device resting against the high part $w^{14}$, the position occupied by the feed-wheel at such time insuring the driving of the fastenings in the line nearest the edge of the sole, as when the fore part of the sole is being united to the upper and inner sole. The lever having the graded cam-surfaces has at its rear side (see Fig. 42) a series of holes $w^{16}$, one or the other of which may be made to engage a short stud $w^{17}$, occupying a fixed position at the inner side of the nut $f^7$, (see Fig. 41,) said nut also having its hub $w^{18}$ extended therefrom sufficiently to constitute a bearing for said lever. This positioning device affords a ready and quick means by which the operator without stopping the machine may instantly change the position of the acting edge of the shoe-feeding wheel to put it in the desired position with relation to the path of movement of the driver to insure the driving of a series of fastenings at the desired distance from the edge of the sole, and by adjusting said positioning device as herein provided for I am enabled by reason of the three varying surfaces to provide for three different lines of nailing, and to insure exceeding fine adjustments I may turn the positioning device on or with relation to the nut so as to let one or the other of the holes $w^{16}$ engage the pin $w^{17}$, so that the high point $w^{14}$ of the said positioning device carried by the screw-threaded nut may occupy any exact position desired. It will therefore be understood that by rotating the nut $f^7$ the feed-wheel may be located at any desired distance from the line of movement of the driver, the edge of the feed-wheel also constituting an edge gage to determine the distance at which the line of fastenings may be inserted with relation to the sole into which the fastenings are being driven. The spring referred to performs simply the function of keeping the arm against the inner side of the positioning device.

From the foregoing it will be understood that the pawl-carrier $c^{13}$ has a uniform stroke, that said pawl-carrier is connected with a rock-shaft $c^{14}$ for imparting movement to the shoe-feeding device, and that the movement of said shaft derived from said pawl-carrier is always the same; but the pawls carried by said pawl-carrier in the movement of said carrier are made to operate the wire-feeding mechanism for variable distances, according to variations desired in the length of the fastenings to be made, and preferably this variation is effected automatically by variations in thickness of the stock.

Having now described the wire-feeding mechanism and the parts constituting the wire-guide, I will now describe the manner of shaping, cutting, and bending the wire in the formation of the fastening which this machine has been devised to produce.

Herein for sake of simplicity I have connected with the parts $c^3$ and $c^4$ certain operative parts, such as the under or stationary cutting edge $g$ and the anvil $g'$, making the said parts in one piece with the part $c^4$, simplifying and cheapening the construction of the machine, and establishing a certain fixidity of the parts which is very desirable; but it will be understood that the edge $g$, constituting the under or stationary device of the wire-cutting mechanism, and the anvil might be made in separate pieces and suitably supported at or near the end of the part $c^4$. With this intimation as to a feasible modification of my invention I will state that the end of the piece $c^4$ has a shaping-surface $g^{2\times}$, constituting the outer side of the anvil $g'$, and at the junction of said face and that portion of the part $c^4$ presenting the cutting edge $g$ I have formed a notch $g^3$, thereby reducing the effective length of the edge $g$ and defining the position of said edge with relation to the face $g^{2\times}$, so that said edge will start to cut into the wire at a slight distance from the vertical plane of the face $g^{2\times}$, such shape and location of the cutting edge $g$ enabling more stock to be left in the bend of the wire to constitute the head of the fastening than if the said edge intersected the face $g^{2\times}$. The action of this edge is represented in Fig. 23, where I have represented a portion of the stock $g^4$ as left in the wire at the inside of the bend $g^5$, made when the shank $g^6$ of the fastening is formed in making the first bend in the wire, the bend $g^5$ constituting the starting of the head of the fastening. Viewing Figs. 19, 19$^a$, and 19$^b$ and also Figs. 27 and 29, it will be noticed that the ends of the parts or blocks $c^3$ and $c^4$ are cut away, and viewing particularly Figs. 27 and 28, representing the inner sides of the two parts $c^3$ and $c^4$ and the groove in which the wire is fed, it will be seen that the upper surface left by removing portions of the parts $c^3$ and $c^4$ exposes the wire, as represented by full lines in Figs. 19 and 36$^b$, and the delivery end of said groove is somewhat inclined upwardly, as best represented in Fig. 27, to slightly elevate the wire as it leaves the groove, such upturning of the wire at the delivery end of the groove giving it an upward curve. This curved portion of wire constitutes the shank or body $g^6$ of the fastening, which curves outward or away from the head, as shown at the right in Fig. 23. Giving this shape to the fastening enables it to be driven straighter than would be the case if the shank or body were straight, as a straight shank in a fastening of this description has a tendency to curl or bend toward the depending head when the driver is acting on the one-sided head. While the wire is exposed in the groove of the guideway the blank for the fastening is severed by the movable cutter $h$ coöperating with the stationary cutter $g$. This movable cutter $h$ (shown detached in Fig. 5) is secured in the groove $h'$ at the lower end of the carriage F, being held in place by plate $h^{22}$, secured by set-screws $h^{23}$. (See Figs. 6 and 14.) These cutters are formed to sever the wire diagonally, thus forming a tapered head-forming portion for the fastening and also leaving a tapered portion on the wire to form the point of the fastening next to be made. Herein as the cutters cut the wire to present a tapered end 23$^\times$ they also form a bevel $p$ (see Figs. 36$^c$ and 36$^d$) at one edge of the tapered point, said point constituting a point for the next fastening to be made. The carriage F, hereinbefore referred to, is shown detached in Fig. 3 and in position in Figs. 1, 6, and 12, it being herein represented as having a split part $h^2$ to embrace an eccentric stud $h^3$, the outline of which is represented by dotted lines in Fig. 12, said stud entering a bearing in the head A$^2$ and being retained therein by a suitable screw $h^4$, inserted through a washer $h^5$, the end of said stud being square to be engaged by a suitable wrench, in order to turn the stud, and thereby adjust the carriage, as herein represented, vertically, in order that the lower or cutting edge of the end of the movable cutter-blade may come properly in alinement with the edge of the stationary cutter $g$, such adjustment being necessary at times to provide for adjustment of the parts due to wear in use and also enabling the point to be varied as to thickness. The stud $h^3$, on which is pivoted the carriage carrying the movable cutter, occupies a position substantially parallel to the wire-passage of the wire-guideway, and the power for actuating said carriage is so exerted that when the movable cutter meets the wire to sever it between itself and the fixed cutter the movable cutter is maintained in close contact with the stationary cutter, and owing to the direction in which the actuating power is applied to the carriage the movable cutter is prevented from rising as it meets the wire. The carriage F is clamped on its stud by a suitable clamp-screw $h^6$ and has a suitable hole $h^7$ (see Fig. 3) made in it at the inner end of a slot to thus form a split or clamping section, and said hole receives a stud $h^8$, having an eccentric end $h^9$, thus making of it an eccentric stud. The stud is clamped in the hole of the carriage by means of a suitable clamp-screw $h^{10}$, and the eccentric end $h^9$ of the stud receives upon it a suitable roller $h^{12}$. (Shown by dotted lines in Fig. 14.) The roller-stud enters the cam-groove $C^4$ (see Figs. 10 and 14) in the left-hand side of the cam-block C', said groove being hereinbefore referred to, it acting to move the carriage F to and fro at the proper time, said movement in the form in which I have chosen to represent my invention being an oscillating movement; but it will be obvious that the movement might be one of reciprocation and accomplish the same results— that is, to cause the movable cutter member carried by it to be actuated at the proper times and put the shaping device and the bender, to be hereinafter described, carried by it in position at the proper times to operate, as will now be explained. The carriage F is grooved at its inner side at $h^{13}$ (see Fig. 3) to receive the shank of a slide-bar $h^{14}$, herein represented as toothed at $h^{15}$, said bar deriving vertical movement in said carriage from the teeth of a sector-lever $h^{16}$. (Shown by full and dotted lines in Fig. 6.) Said lever is pivoted on a suitable stud $h^{17}$, (see Fig. 6,) sustained in a hole $h^{18}$ (see Fig. 3) of said carriage, the opposite end of said lever having clamped in it a suitable stud $h^{19}$, like the eccentric stud $h^8$, represented in Fig. 4 and before described, said stud receiving upon it a roll, as $h^{20}$, which enters the groove $C^3$ in the right-hand face of the cam-block C', said groove operating said toothed lever to reciprocate said slide at the proper time, the effective stroke of said slide in said carriage, herein represented as vertical, being determined or regulated by the adjustment of the stud $h^{19}$. This adjustment is very desirable, as thereby it is possible to put the preferably-inclined lower end or shoulder 28 of the shaping device $m$ at any desired position with relation to the center line of the groove guiding the wire in order that the upturning of the wire as it is being fed out of the guideway, as described, may be limited, and thereby the degree of curvature to be put into the shank of the fastening may be controlled. The bar $h^{14}$ referred to is notched at $h^{22\times}$ (see Fig. 3) to receive a projection $h^{24}$, extended from one side of what I have herein chosen to designate as the "shaper" or "shaping device" $m$, said device being secured in said groove at the lower end of said bar by means of a suitable clamp-screw $h^{26}$. Preferably this shaping device has connected with and forming part of it a bender $m'$, and between the said bender and the said shaping device there is a passage $m^2$, (see Fig. 21,) which serves as a guide for the driver $b^{10}$ and also receives the formed fastening and holds it in its formed condition in position under the driver. The nose $b$, depending from the plate $d^{20}$, before described, is provided with a driver and fastening passage 30, which occupies a position normally fixed with relation to the front line of the anvil $g'$, the lower end of said nose receiving the stock against it and constituting, as represented, a stationary foot, against which the upper side of the stock is pressed by the horn sustaining the under side of the stock. The nose is of somewhat peculiar shape—that is, viewing Figs. 6 and $19^b$ one side thereof is concaved, as at 31, to thereby leave a projection or lip 32, which may be of any desired width and which engages the lip of the channel in the sole. Viewing particularly Figs. 19 and 22, it will be seen that the lower end of the bender is inclined from its acting corner 33 (see Fig. $19^a$) upwardly and forwardly, thus leaving a clearance below its lower end and the groove 34, (shown in Figs. $25^b$ and 26,) made in the upper end of the nose at one side of the point where it is attached to the plate $d^{20}$ by the set-screw 35, said groove coöperating with the inclined end of the bender to prevent the accumulation under the bender of any waste, dirt, &c., which might accumulate there in the operation of the machine, the said groove affording a channel for the escape of any chips, &c. Assuming that the wire or fastening material has been fed through the guideway into position, Figs. 19 and 20, the delivery ends of the parts $c^3 c^4$ are forced firmly together to clamp and hold the wire in the position shown in said figure by means of a lever $n$, having at one end a stud $n'$, (represented by dotted lines, Fig. 6, and in section, Fig. 14,) said stud preferably forming a part of the lever and entering a suitable hole (see Fig. 14) in the head $A^2$, the lever being provided at its opposite end with a suitable roller-stud $n^3$, normally kept pressed against the periphery of the eccentric-faced cam-block C', the roller traveling in the groove $C^2$ therein. The lever $n$ (see Figs. 6 and 14) has a shoulder $n^4$, which normally abuts against the rear side of the part $c^3$ of the wire-guideway; but the weight of the lever and its roller are insufficient to spring the part $c^3$ and cause it to clamp the wire between itself and the part $c^4$; but whenever the weight of the lever is aided by the action of the high or eccentric part $n^5$ of the cam-block $C'$ then the pressure on the lever $n$ is sufficient to overcome the normal stiffness of the part $c^3$ and cause it to be sprung sufficiently to clamp the wire firmly between itself and the part $c^4$. The wire being clamped, as stated, the shaping device $m$ is caused to descend, it meeting the end of the wire projected more or less from the wire-guideway, (see Figs. 19, 19$^a$, and 20,) according to the work being done, and bending the same, as shown at $g^5$, (see Fig. 21,) thus forming at the end of the wire a substantially right-angled portion, leaving the end of the wire in condition to form the shank of the fastening to be made. The acting edge of the cutter $h$ is shown as inclined, (see Fig. 5,) and its rear corner next the shaper occupies a position substantially in line with the shoulder 38 of the shaper $m$, and after the shaper has descended sufficiently to form the first bend in the wire to define the distance of the head of the fastening from the point of the shank the carriage is moved forward and the cutter $h$ severs the wire. As has already been explained, when the fastening is severed from the wire at the same time and by the same operation a tapered point is formed on the body of the wire left in the guideway, and this tapered point constitutes the point for the fastening next to be made. This point is the portion of the wire left in the guideway below the cutting edge $g$ of the stationary cutter and below the path of movement of the movable cutter $h$. In making this diagonal cut the movable cutter $h$ of course exerts considerable force upon the wire, and the result of this powerful lateral pressure on the wire is that that edge of the tapered portion of the wire left in the guideway which is first acted upon by the movable cutter is in the operation of forcing away the wire above it toward the stationary cutter pulled or crowded in the same direction in which the movable cutter is operating—that is, toward the stationary cutter. This may be made clearer by reference to Fig. 36$^d$, which shows enlarged the end of the wire which was left in the guideway after the fastening was severed. When this portion of the wire (shown in Fig. 36$^d$) was in the guideway, the left-hand edge of the tapered point was adjacent to the stationary cutter $g$ (see Figs. 28 and 29) and the movable cutter in the operation of severing the wire first operated upon the wire at the right-hand side. In forcing that portion of the wire being removed away from the portion of the wire shown in Fig. 36$^d$ and against the stationary cutter I find that the movable cutter pulls or crowds the portion of the wire on the right-hand side of the edge of the tapered point 23$^\times$ left in the guideway toward the stationary cutter, thus forming the rounded corner on the edge of the tapered point, which I have called the "bevel" and have marked $p$ in the drawings. This bevel is on the side of the fastening which is nearer the outside or edge of the stock when the fastening is driven and causes the point of the fastening to be slightly inclined away from the outer edge of the stock. This is especially desirable when the machine is used to attach the soles of shoes, as the bevel insures that the fastening will not be "driven out" or in such direction as to enter the upper.

I have also devised means for curving or bending the wire before it enters the guideway, whereby I can cause the production of a curved fastening. The result of curving the fastening is to cause it to be driven at an inclination to the line of movement of the driver.

In the production of a medium-cost shoe it is desirable to insert the fastening as near as possible to the edge of the outer sole and the point of the fastening must clench in the inner sole. The distance between the edge of the outer sole and the inner sole varies considerably in different shoes, and when the variation is normal the beveled point on the nail alone causes said point as the fastening is driven to travel inwardly sufficiently to enter the inner sole. If the fastening is not clenched in the inner sole, the shoe is faulty, so the beveled point becomes a matter of very decided importance. If the fastening is to be driven into an outer sole or a channel therein at a point closer to the edge of the sole than usual because the stock in the outer sole, for instance, is inferior in quality and consequently not so stiff and its edge has to lie closely in contact with the upper, I find it desirable to curve the wire toward the bevel of the point, as shown in Fig. 23$^a$. This curvature increases the inclination given to the fastening by the beveled point. Further, in case it should be desired to drive the fastening substantially straight through the stock and at the same time preserve and utilize to its full extent the advantage of the beveled point in penetrating the stock more easily, then I may curve the wire in an opposite direction, as shown in Fig. 23 at the left, so that the beveled point and the curve working in opposition result in the driving of the shank of the fastening substantially straight into the stock. In this way I can compensate, if desired, for the inclination given to the fastening by beveling the edge of the tapered point, so that the fastening will be driven straight, or I can cause it to be driven at a greater inclination than that caused by the bevel, or I can cause it to be driven at an opposite inclination. I accomplish this by means of a curver $c^\times$ for the wire, (see Figs. 10, 11$^a$, and 36$^a$,) said curver being secured to the head of the machine by a suitable screw, which can be loosened to allow the curver to be turned on it as a pivot, so that the wire passing through a hole $c^{xx}$ in the lower end of the curver may by turning the curver so that the hole therein is at one side of the line of the wire-passage in the blocks $c^3$ and $c^4$ (see Fig. 11$^a$) be curved, as shown in Fig. 23, and this curvature being produced by the adjustment in one or the other direction of the curving device it will be obvious that by merely adjusting said device the direction of the curve and its extent may be varied at will according to the requirements of the work to be done, and so provision may be made for driving the fastening at any desired inclination to either side of the plane of the head of the fastening. When the curved wire is clamped in the wire-guides $c^3$ and $c^4$, the wire will only be sprung into a straight line and will resume its curved shape as soon as the pressure is removed. As the cutter completes the operation of severing the wire the shoulder 38 of the shaper, acting against the rear side of the shank of the fastening, and the inclined edge $h^{40}$ of the forwardly-moving cutter, acting against the short end of the wire to constitute the head, cause the shank and short portion of the wire to be moved uniformly and positively forward, putting the short end $g^2$ of the wire upon the anvil $g'$, the shaper $m$ in the meantime keeping the shank of the fastening in contact with the vertical end of the wire-guide.

The anvil $g'$, represented as integral with the member $c^4$ of the wire-guide, is shaped, as best represented in Figs. 19, 28, and 29, to present a substantially vertical outer wall, the inner wall near its upper end being, however, beveled, as at 2, and viewing the upper side of the member $c^4$ of the wire-guide it will be seen that in cutting the same away to form the anvil (see Figs. 24, 28, and 29) there is left standing next the inner side of the anvil a wall 3, located at an angle to the wire-passage in the wire-guide, said wall being at the same angle as the acting edge of the cutter $h$, so that said cutter in its forward movement acts with its inclined edge against the short end of the wire severed by it from the main body of the wire and moves it forward into such position that the inclined edge of the cutter will coincide vertically with the top of the inclined wall 3. The rear side of the bender is also shaped to present a face 4, (see Fig. 19$^a$,) alined with the inclined end of the cutter and the wall 3, and when the end of the cutter brings the short end of the wire in position directly over the inclined wall 3 the shaper and bender have a further descending movement, causing the bender to meet the short end of the wire and in its descent shape the said short end to form the head of the fastening with a depending point. In this action of the bender the tapered part of the under side of the short end of the wire is forced by the bender in contact with a beveled part 2 of the anvil, thus giving to the depending head of the fastening completed by the action of the bender a shape which conforms substantially to the shape of the portion 2 of the anvil, this shape being shown and designated by $2^x$ in the fastening represented in Fig. 23.

In cutting away the portion 3 of the wire-guide to form the anvil I remove the material to a varying depth, so that the space 3 at the rear side of the anvil, looking at it at its top, (see Fig. 29,) decreases in depth and is inclined outwardly from about the point 6 to nearly the lower edge of the space 3 (see Fig. 24,) leaving a guiding portion 7 (see Figs. 21 and 24) on the portion $c^4$, which occupies such position with relation to the anvil that the formed fastening in its descent under the action of the driver $b^{10}$ against the depending head of the fastening will, should it deviate at all from its true and proper position for driving, be turned aside to enter correctly the passage 30 at the upper end of the nose $b$. Were it not for this surface 7 the head of the fastening if twisted or displaced when leaving the anvil and being acted upon by the driver to drive the completed fastening from between the parallel surfaces of the shaper and bender, then holding the fastening frictionally, as will be described, might strike the upper end of the nose, which would so bend the point depending from the head of the fastening that the fastening could not be properly driven. After the head of the fastening has been formed continued movement to the left (viewing Fig. 6) of the shaping device and the bender will feed the formed fastening from the end of the anvil, the point of the shank traversing the face 40 of the nose above the opening 30, and as the said point arrives in line with said opening the driver is permitted to descend quickly, meet the head end of the fastening, and drive it from the nose $b$ into the stock, the horn at such time being in its clamping position to resist the blow of the driver. The fastening-passage 30 in the nose $b$ (see Figs. 26$^c$ and 26$^d$) is represented as oblong in cross-section, and said passage, measured in its cross-section at its widest point, is of substantially the size of the completed fastening measured in the dotted line $y^2$, Fig. 23, crossing the body at the end of the point depending from the head. It will be noticed that when wire is bent over an anvil the wire removed from the devices employed to bend it will always have a tendency to expand somewhat as the wire seeks to resume its original position, and that it is practically impossible to bend a piece of wire so that when relieved from the strains to which it was subjecting in bending the wire will remain exactly in the shape in which it was held by the bending devices. Taking advantage of this fact, I have so calculated the width of the anvil over which the wire forming the head of the fastening is bent with relation to the area of the fastening-passage in the nose and I have so proportioned the space $m^2$ between the adjacent parallel surfaces of the shaper and the bender and the substantially parallel end walls $s$ $s'$ of the fastening-passage of the nose as to prevent the expansion of the head part of the fastening while the shank of the fastening is being driven into the stock, the shaper and bender and the end walls of the nose retaining the fastening in the condition it was in when upon the anvil until the depending point of the head meets the stock. In this way it will be understood that I utilize this tendency of the fastening to expand after leaving the anvil to insure an accurate and positive guiding of the fastening as it is being driven through the nose into the stock, and during this driving operation the point depending from the head rests against and slides frictionally over the preferably-rounded end $s$ of the passage 30 in the nose, while the shank of the fastening acts frictionally against and travels in contact with the other end $s'$ of said passage, also preferably rounded, the friction of the fastening against the said walls being sufficient to keep the fastening in any position in which it may be put in said passage, and the driver in driving the fastening through said passage has to overcome the friction of the fastening against the inner walls of the passage in the nose. I have found it indispensable to the successful operation of the machine so to form the driver-passage in the nose that the fastening will be driven straight into the stock. To insure the entrance into the nose-passage of the complete fastening having this tendency to expand after leaving the anvil, and yet not permit the fastening to obey its natural tendency to expand during the operation of driving the same, I employ the following construction of parts: I provide the cap-block $d^{20}$ at its inner side (see Fig. 19$^a$) with an open passage 12, in which may enter the bender $m'$ as the latter is depressed to complete the depending head of the fastening, said bender thus working in an inclosed passage formed by said block and the wall 3 of the portion $c^4$ of the wire-guide. The block $d^{20}$ has projecting from its front end an arm $d^{20 \times}$, to which is adjustably connected by suitable set-screws 13$^\times$ a plate 13, the set-screws being extended through slots 130$^\times$, made in said plate. The attaching of this plate to the block leaves behind the plate and between the plate and the end of the block a space 12, in which the bender $m'$ descends. The end 14 of the plate 13 stands vertically in alinement with the side $s^2$ of the passage 30 in the nose, and the end of the anvil occupies a position vertically above and in substantial alinement with the opposed side $s^3$ of the passage 30. There is thus left between the end of the anvil and the said vertical end 14 an open space just wide enough for the driver $b^{10}$ to enter in driving the fastening, and the fastening when removed from the anvil is put into this space, being also held frictionally in the space $m^2$ between the substantially parallel inner walls of the shaper and bender and is driven therefrom into the passage 30 of the nose and through it into the stock, while the set-screws, working in the slots in the plate 13, confine the plate in position, yet they do not positively fix the plate to the block so that the plate is immovable; but, on the contrary, said plate may, under abnormal pressure, slide bodily over the set-screws. This provision may prevent breakage of the parts, as in case a driver should be broken or be stuck in the passage between the end of the wall and the end of the anvil the shaper, bender, and cutter continue to operate, making fastenings and feeding them from the anvil toward the driver-passage.

In the apparatus herein described the fastening is moved positively by the driver from the position Fig. 26, in which the fastening is left when removed from the anvil until the fastening is fully driven into the stock.

If the formed fastening should be delivered into the space between the end of the anvil and the vertical wall 14 and there was nothing to prevent, the head part of the fastening would immediately expand; but to prevent this the inner wall of the shaper and the substantially parallel wall of the bender serve to hold the fastening in exactly the position in which it was bent even when the fastening is removed from the end of the anvil. As the fastening is completed (see Fig. 26$^a$) the inner side of the bender forms a back wall for said space and the inner side of the shaper forms a front wall for said space, and in the final position of the shaper and bender, to be described, before the driver is permitted to descend and drive the fastening the lower end of the bender meets the upper end of the wall or shoulder 40 of the nose, the inner side of the bender then standing in vertical alinement with the rounded edges of the passage 30 in the nose, while the lower end of the shaper (see said figure) meets the shoulder 16 of the nose, and the inner side of the shaper then stands substantially in vertical alinement with the part $s'$ of the passage 30 in the nose. As the shoulder of the shaper and the edge of the cutter act in the final movement of the carriage F, carrying the shaper, cutter, and bender, to remove the formed fastening from the anvil the end of the cutter is moved into a position substantially flush with the vertical end of the anvil and one side of the fastening is put substantially in contact with the alining wall 14, and at the same time the shoulder 38 of the shaper comes into position at such distance from the vertical wall 14 as to constitute a guide for the side of the fastening, said shoulder being at that time substantially in alinement with the side $s^3$ of the passage in the nose.

Fig. 26$^a$ shows the shaper and bender in their final position, where their vertical walls coincide with and are in alinement with the portions $s$ and $s'$ of the passage in the nose, and there is no shoulder or break in the surface against which any part of the fastening acted upon by the driver may strike. Herein it will be noticed that the fastening while yet held in the condition left by bending is delivered into an auxiliary driver or fastening passage composed of the end wall 14, the anvil, the shoulder, and the inner adjacent sides of the bender and the shaper, and that the walls of this auxiliary guide during the operation of driving the fastenings are in substantial vertical alinement with the walls of the passage in the nose through which the fastening is driven by the descending driver, and that when the fastening is being driven there is practically no break in the alining surfaces of the auxiliary passage and the alining surfaces of the passage 30 in the nose, and that consequently there is no opportunity for the fastening to catch or strike any projection while being driven from the auxiliary passage into the passage in the nose, and that during the entire travel of the fastening through both passages the spring in the fastening stored up therein in the bending operation is retained and utilized to accurately guide and position the fastening while entering the stock.

The fastening, as has already been explained, is formed with its short depending point at an angle to the shank, the widest part of the fastening being at the point of the depending head, and considering it as having been released from the machine and having expanded slightly at its head in its widest part, as all bent wire will expand after having been released from the action of the devices which bent it, then such fastening is slightly wider than the driver-passage.

The driver-passage keeps the fastening straight by slightly springing the depending head toward the shank. The result is that the shank is forced against the side of the driver-passage and kept there while the fastening is being driven.

In starting the machine for making fastenings automatically measured as to their length according to thickness of the stock the operator puts his foot on the treadle $D^5$ and depresses the rod $D^4$, causing it to turn the lever D until its upper end meets the stud $C^{17}$ of the starting-lever $C^{13}$, causing it to release the brake, the movement of said lever also withdrawing the starting arm or lever $C^{16}$, letting the clutch-pulleys meet and start the operative parts.

Before starting the machine the operator puts the shoe to be nailed on the horn and in doing so depresses the horn slightly against the action of its balanced spring, and the shoe having been applied the operator lets the horn rise under the action of the balanced spring or otherwise, thus clamping slightly the stock to be nailed between the top of the horn and the under side of the foot. The machine is started, and it will be understood that the cam $a^{20}$, connected with the rod $a^8$, is elevated more or less, according to the thickness of the stock between the horn and the nose-plate, the said cam occupying a higher position as the stock is thicker, and vice versa, the position of said cam controlling, as stated, the extent of feeding movement of the fastening material. The down movement of the lever $a^{15}$, actuated by the carriage F, to which it is attached by the pin $e^{16}$ and the set-screw $o$, causes the descent of the rod $a^8$ at the proper times to actuate the lever $a^6$ and force the end of the horn upward, thus clamping the stock firmly during the time of driving the fastenings, as hereinbefore stated.

I have illustrated in the drawings, Figs. 1 and 2, an extra treadle $D^{5\times}$ and have shown in Figs. 38, 39, and 40 treadle-controlled mechanism for actuating the regulator for the production of fastenings of different lengths. This mechanism may be used when automatic measuring of the fastening is not required—as, for example, when the machine is used for sole-laying, where only two lengths of fastenings are required, one for the ball and the other in the shank of the sole. Said devices are not herein claimed, as they have been made the subject-matter of a divisional application, Serial No. 44,375, filed January 23, 1901.

It will be understood that the work-feeding wheel herein described and the provision made for adjusting it quickly into position for different lines of nailing are applicable for use in any machine uniting material sustained on a horn or work-support.

I find it important that the shank A' of the column A be so constructed that one part may be readily adjusted vertically over or with relation to the other part and that during such adjustment the shank may be guided accurately and maintained in its proper vertical position. The shank and the column are usually of cast metal, and I desire to obviate finishing a large portion of the contact-surfaces of the shank and column, thereby saving considerable expense. I have so shaped the column in cross-section as to present at one side a substantially V-shaped or vertical groove, and the shank is of a similar shape to fit externally the interior of said groove. At the inner side of the column I have provided it with suitable narrow ways $u\ u$, (see Fig. 1$^\text{a}$,) against which may contact a smooth part, as $u'$, of the exterior of the shank, and I have provided the shank with a projection, as $u^2$, (see same figure,) which slides up and down against a planed portion $u^3$ of the column. In this way it will be noticed that there are three bearing-points between the shank and the column, leaving considerable space $u^4$ between said column and shank, so that only small portions of the opposing surfaces of the column and shank have to be finished in order to correctly aline and adjust the shank on or with relation to the column.

Giving to the column and shank the shape stated in cross-section enables me to produce a very stiff and rigid column and shank, and I use for such purpose a minimum weight of metal, which of course is of very considerable importance not only as regards convenience in handling the machine, but in the cost of manufacture and transportation, it being well understood that metal structures angular or V-shaped in cross-section present great strength.

Viewing the enlarged detail, Fig. 36$^b$, it will be noticed that the upper outer edge of the anvil at its delivery end is slightly enlarged at $g^{10}$. This enlargement prevents the escape of a fastening from the short forming-surface of the anvil except when the bender and shaper are moved positively to effect the discharge of the fastening from the end of the anvil. Without this construction there would be danger of the fastening becoming displaced on the anvil when the machine is operated at high speed.

I have shown the machine for making the novel fastening herein set forth as adapted to drive each fastening as made; but it will be understood that I might make the fastenings on one machine and drive them on another, using on each machine so much of the mechanism herein described and claimed as might be found necessary or convenient for its part of the work.

The fastenings herein shown are made the subject-matter of claims in application, Serial No. 44,376, filed on the 23d day of January, A. D. 1901, and a shoe having its sole and upper united by such fastenings is made the subject-matter of claims in another application, Serial No. 17,939, filed on the 25th day of May, A. D. 1900.

Having thus described my invention, what I claim as new, and desire to secure by Letters Patent, is—

1. A machine for securing together layers of material by means of fastenings each having a hook-shaped end to engage one side of the stock and a hook-shaped end to engage the other side of the stock with a single strand of wire connecting said ends; comprising means to form from continuous wire a fastening having a shank or body and having a narrow hook-shaped head, means to drive said fastening into one side of the stock, insert and embed the hook-shaped head in that side of the stock and force the point of the shank entirely through the stock, and means to turn back the point of the shank into the opposite side of the stock and embed it in that side of the stock.

2. A machine for securing together layers of material by means of fastenings each having a hook-shaped end to engage one side of the stock and a hook-shaped end to engage the other side of the stock with a single strand of wire connecting said ends; comprising means to form from continuous wire a fastening having a shank or body and having a narrow hook-shaped head, means to vary automatically the length of the shank according to the varying thickness of the stock, means to drive said fastening into one side of the stock, insert and embed the hook-shaped head into that side of the stock and force the point of the shank entirely through the stock, and means to turn back the point of the shank into the opposite side of the stock and embed it in that side of the stock.

3. A device to guide fastening material, means to feed said material in said device, a shaping device to meet said fastening material and bend it to form the shank or body of a fastening, cutting means to sever said fastening material at a short distance from the bend made therein, and separate means to bend the short portion of fastening material extending from the shank to form a head with a downturned portion.

4. In a machine of the class described, means for bending wire to form the shank or body of a fastening, means to sever the fastening from the wire, and means to bend a portion of the fastening to form a head, and a point extending from the shank at an acute angle, said point being shorter than the shank.

5. In a machine of the class described, means for bending wire to form the shank or body of a fastening, means to sever the fastening from the wire, means to bend a portion of the fastening to form a head, having a head and a point extending from the shank at an acute angle, said point being shorter than the shank, and means to vary the length of the shank of the fastening.

6. In a machine of the class described, means to form the shank or body of a fastening, means to sever the fastening from the wire, means to bend a portion of the fastening to form a head having a downturned portion, and means to vary the length of the shank or body of the fastening without varying the length of the depending head.

7. In a machine of the class described, means to form from wire the shank or body of a fastening, means to sever the fastening from the wire, means to bend a portion of the fastening to form a head having a downturned portion, and means to vary automatically the length of the shank or body of the fastening according to the varying thickness of the stock without varying the length of the depending head.

8. A wire-guide made of parts suitably grooved to receive the wire, one of said parts presenting an inclined face for part of its length, whereby one part of the guide may be rocked on the other part to clamp the wire.

9. In a machine of the class described, a wire-guide composed of two parts face to face, the faces at one end of the wire-guide being normally separated, a lever acting upon one part of said wire-guide, and means to actuate said lever to bend slightly one part of said wire-guide that it may approach the other part thereof and clamp the wire between said parts.

10. In a machine of the class described, means to sever a fastening from a wire, means to clamp the wire immediately adjacent to said severing means while the wire is being cut, means to form the shank or body of the fastening, and means to bend a portion of the fastening to form a head with a downturned portion.

11. A device to guide fastening material, means to feed said material in said device, a shaping device to meet said fastening material and bend it to form the shank or body of a fastening, cutting means to sever said fastening material at a distance from the bend made therein in forming said shank, and means to clamp said fastening material in the guiding device while the cutting mechanism acts to sever the fastening material.

12. A machine for inserting metallic fastenings, comprising means for forming from continuous wire a fastening having a shank or body and having a head with a point depending from said head, said depending point being shorter than the shank, and means for forming a clenching-point on the shank, combined with means for driving said fastening and means for turning back the point of the shank into the work toward the depending point of the head, said inturned point being on the same side of the shank as the depending point of the head.

13. A machine for inserting metallic fastenings, comprising means for forming from continuous wire a fastening having a shank or body and having a head with a point depending from said head, said depending point being shorter than the shank, and means for forming a clenching-point on the shank, combined with means to vary automatically the length of the shank according to the varying thickness of the stock, means for driving said fastening and means for turning back the point of the shank into the work toward the depending point of the head, said inturned point being on the same side of the shank as the depending point of the head.

14. A machine for inserting metallic fastenings having a head with a depending point and a shank or body longer than said depending point, comprising wire-feeding mechanism, a stationary cutter, an anvil, means to feed the wire over and beyond the anvil a sufficient distance to afford wire for the shank of the fastening, leaving a shorter portion of the wire between the anvil and the cutter for the head of the fastening, means to bend the wire to form a fastening having a shank and a hook-shaped head, means to drive said fastening and embed the hook-shaped head in the stock, and means to turn back the point of the shank and embed it in the stock.

15. A machine for inserting metallic fastenings comprising means for forming a fastening having a hook-shaped head and a shank or body with a clenching-point, means for inserting the shank of said fastening through the stock and its hook-shaped head into the stock and means for turning back the clenching-point of the shank into the stock, forming a hook-shaped end, whereby the stock is united by means of fastenings having hook-shaped ends with a single strand of wire connecting said ends.

16. In a machine of the class described, a wire-guide, a shaping device, wire-cutting mechanism, a bender, means to move the fastening from the position where it is acted upon by the shaper into position to be acted upon by the bender and means to actuate the shaper and bender to form a fastening having a head with a depending point and a shank longer than said depending point.

17. A wire-guide, an anvil, wire-cutting means, a shaping device having a shoulder, and a bender coöperating therewith, combined with suitable actuating mechanism for said cutting means, said shaping device, and said bender, whereby the wire is bent and severed to form a blank for the production of a fastening, said blank being thereafter fed onto the anvil by the shouldered part of the shaping device to be then acted upon by the bender to complete the fastening.

18. A wire-guide, a shaper, means to actuate the shaper to bend the wire, means for thereafter moving the bent part of the wire laterally with relation to the main body of the wire in the wire-guide and means for thereafter bending the wire further in the producing of a fastening having a hook-shaped head.

19. A wire-guide, a coöperating shaper, means to move the same to bend the wire, wire-cutting mechanism, and means to actuate the cutter and shaper to feed the bent part of the wire laterally with relation to the main body of the wire in the wire-guide, an anvil and a bender to bend the wire over the anvil.

20. A wire-guide, an anvil located at the end thereof, a shaping device to bend substantially at a right angle the end of the wire thrust from the wire-guide, cutting mechanism to sever the wire just behind the bend therein made by said shaping device, means to move the severed part of the wire and put that portion thereof back of the bend in position over the anvil, and a bender to act upon the wire supported by the anvil and form a head for the fastening presenting a downturned point.

21. In a machine of the class described, a wire-guide shaped near its delivery end to expose that part of the wire which is to be removed for the production of a fastening, combined with cutting mechanism to sever the wire diagonally leaving in the passage of the wire-guide that portion of the wire which is to form the tapered point of the next fastening to be made from the body of the wire, means for bending the wire to form the shank of a fastening and means for further bending the wire to form a hook-shaped head.

22. In a machine for inserting fastenings, a guide for the wire, cutting mechanism to cut the wire diagonally to form a tapered point, said cutting mechanism also somewhat beveling the edge of the tapered point at the side thereof which is first acted upon by the wire-cutting mechanism.

23. In a machine for forming fastenings from wire, a wire-guideway, said guideway being shaped near its end to expose that part of the wire of which the fastening is to be made, and a cutter to cut the wire diagonally and bevel one edge of the tapered point on the end of the wire left in the guideway, and form a point for the shank of the fastening next to be made.

24. In a machine of the class described, a wire-guide, in which is exposed that part of the wire to be removed in the formation of a fastening, and wire-cutting mechanism shaped to cut the wire, said cutting mechanism acting also to slightly bevel before fully severing one side of that part of the wire to constitute the point of the next fastening, said beveled point controlling the direction of movement of the shank of the fastening as the latter is driven into the stock.

25. A shaping device, and a wire-guideway composed of parts presenting a suitable groove for the wire, said parts being shaped near their delivery ends to expose a part of the wire back of the delivery end of the guideway, one of said parts having a stationary cutter presenting an edge which terminates short of the end of the wire-passage at the delivery end of the guideway, a shaping device to act on and bend the wire to determine the length of the shank of the fastening, and a cutter coöperating with the stationary cutter to bevel and sever the wire, leaving at the end of the main body of the wire in the guideway a tapered point presenting a slight bevel at one edge.

26. An anvil over which to bend a piece of wire in the formation of the head for a fastening, a carriage containing devices to bend the wire and shape a fastening, a nose or footplate to bear on the surface of the stock, a driver, a horn to sustain the stock, and suitable devices intermediate said horn and carriage to elevate the horn and clamp the stock while a fastening is being driven.

27. In a machine of the class described, a carriage provided with an arm, a wire-cutter, a shaping device and a bender to coöperate in forming a fastening, a horn to support the stock, a driver, and suitable actuating means therefor, and means controlled by the arm of said carriage to keep the horn elevated to clamp the stock while a fastening is being driven into the stock.

28. A wire-guide, a carriage containing a cutter, means to move the carriage to enable the cutter to cut the wire, and a slide-bar in said carriage, and means carried thereby for bending the wire, combined with means for reciprocating said bar in said carriage.

29. A pivoted cutter-carrying carriage, a toothed slide-bar mounted therein and having an attached shaper and bender, and a toothed lever pivoted on said carriage to engage said slide-bar, combined with a cam to actuate said lever and slide-bar.

30. In a machine of the class described, a carriage provided with a cutter, a slide-bar movable in said carriage and provided with a shaping device and a bender, a stationary anvil and cutter to coöperate with the first-named cutter; means to move said carriage, and means to reciprocate said slide-bar in said carriage.

31. In a machine of the class described, a pivoted movable carriage provided with a cutter, a stationary coöperating cutter member, and an eccentric forming the fulcrum for said carriage, the adjustment of said eccentric enabling the cutters to coöperate correctly.

32. In a machine of the class described, means to feed a continuous wire, means to curve said wire, means to form from said curved wire a fastening having a curved shank or body and a hook-shaped head, and means to drive said fastening.

33. A machine of the class described comprising means for curving wire, means for bending the wire to form a curved shank for a fastening and means for further bending the wire to form a head with a depending point.

34. In a machine for inserting fastenings, a wire-guide having a passage for the wire shaped to curve the wire, and a device to control the amount of said curvature.

35. In a machine for inserting fastenings, a wire-guide having a passage for the wire shaped to curve the wire, a device to control the amount of curvature, means to adjust the device to vary the curvature, and means to form and drive a fastening having a curved shank.

36. In a machine for inserting metallic fastenings, a guideway for the wire having its wire-passage curved for a portion of its length to impart a curvature to the fastening, combined with means to form from said wire a fastening having a curved shank or body and a hook-shaped head.

37. In a machine of the class described, a wire-guide composed of parts presenting a suitable groove to receive wire, the delivery end of the groove being shaped to present a curved portion to slightly curve the end of the wire as it is being delivered from the guideway, wire-feeding mechanism to feed the wire through said guide, combined with a device to act against said wire at a point beyond the end of the wire-guide and limit the extent of curvature put into the free end of the wire by said curved delivery end.

38. A machine of the class described comprising means to form from wire a fastening having a head with a depending point and a shank longer than said depending point, said shank being curved away from the head, and means to drive said fastening.

39. In a machine for inserting fastenings, a driver-bar, a lever, a loop connecting said lever and driver-bar, and a strut inserted between the end of said lever and the upper end of said driver-bar, said strut being located inside said loop.

40. A machine for forming metallic fastenings comprising means for bending wire to form a fastening having a curved shank or body and having a head with a depending point shorter than the shank and means to drive said fastening.

41. In a machine for forming metallic fastenings, means to form a fastening having a shank or body and having a head with a depending point shorter than the shank and means to impart a double curvature to the shank of the fastening.

42. In a machine of the class described, means for forming from wire a fastening presenting a tapered point, said wire being beveled somewhat at one edge of said point, a driver and actuating means therefor, and a horn having its shank inclined with relation to the line of movement of the driver to maintain its clenching-cavity in proper position to engage the point of the fastening as it emerges from the stock.

43. Means to form a fastening, a driver, a horn, and connections between said forming mechanism and the horn whereby the horn is held clamped against the stock while the fastening is being driven.

44. Means to form a fastening, a carriage therefor, a work-support, and connections between said carriage and said work-support whereby the work-support is clamped against the work while the fastening is being driven.

45. In a machine of the class described, a guideway for the wire, means to bend said wire, a cutter supporting the wire back of the point where it is bent, said cutter presenting a notch located at its end next the bent portion of the wire, combined with a second coöperating cutting member to cut the wire diagonally, leaving a shoulder adjacent to said bend.

46. A machine for making from wire fastenings presenting a shank and a hook-shaped head, comprising a horn to support the stock, a nose or block to bear upon the upper side of the stock sustained by the horn, a wire-guide, wire-feeding mechanism, and actuating devices therefor controlled by the position of the horn due to varying thicknesses of stock between it and the nose or block, whereby the wire may be projected from the end of the wire-guide for a greater or less distance according to variations in thickness of the stock to receive the fastening next to be made, means for bending the wire to form the shank of a fastening and means for thereafter bending the wire to form a hook-shaped head having a point extending therefrom at an acute angle to the shank.

47. In a machine for making from wire fastenings presenting a shank, a head, and a short prong depending from said head, a horn to support the stock, a nose or block to bear upon the upper side of the stock sustained by the horn, a wire-guide, feeding mechanism, an actuating device therefor controlled by the position of the horn due to varying thicknesses of stock between it and the nose or block, whereby the wire may be projected from the end of the wire-guide for a greater or less distance according to variations in thickness of the stock to receive the fastening next to be made, a shaping device to bend the wire to form the shank or body of the fastening, cutting mechanism to sever the wire back of the point where it is bent by the shaping device, thus leaving at the rear side of said bend a length of wire always the same whatever the length of the shank of the fastening, and means to thereafter bend the wire back of its bent portion to form a head having a depending point.

48. A machine for forming from wire fastenings presenting each a shank and a curved head provided with a depending point to enter the material, comprising wire-feeding mechanism to feed the wire for a variable distance preparatory to making each fastening, the distance depending upon the length desired for the shank of the fastening, and means to form the heads of successive fastenings of uniform size and the depending point of uniform length whatever the length of the shank of the fastening.

49. In a machine of the class described, a wire-guide shaped back of its delivery end to expose the wire, a cutting mechanism coöperating with the exposed wire to sever the same, a shaper to bend the wire, a bender to bend the end of the wire extending from the bend made by the shaper, said bender being beveled at its under side to prevent obstruction to the descent of the bender due to accumulation of chips below it.

50. In a machine for inserting metallic fastenings, a wire-feed wheel, a pawl to actuate said feed-wheel, means to control the operation of said pawl, means to change the position of said controlling means and thereby vary the length of the fastening, a device to lock said controlling means in position, and means to unlock said controlling means automatically at each operation of the machine.

51. In a machine for inserting metallic fastenings, a wire-feed wheel, a pawl to actuate the feed-wheel, a shield to govern the operation of said pawl, means to vary the length of the fastening by changing the position of said shield, and means to lock said shield in position.

52. In a machine for inserting metallic fastenings, a wire-feed wheel, a pawl to actuate said feed-wheel, a shield to govern the operation of said pawl, means to vary the length of the fastening by changing the position of said shield, means to lock said shield in position, and means to unlock said shield automatically at each operation of the machine.

53. In a machine for inserting fastenings, wire-feeding mechanism, a guideway to receive the wire, a shaping device to bend the wire projected from the end of the guideway by the feeding mechanism, a feed-regulator controlled automatically as to its position to thereby alter, as may be desired, the effective stroke of the feed mechanism according to variations in thickness of stock, whereby a greater or less length of the wire may be projected beyond the guideway to be acted upon by the shaping device and form a fastening with a shank of the required length, cutting mechanism to thereafter sever the wire, and means to act upon the wire back of the point where bent by the shaping device to form a head for the fastening.

54. In a machine of the class described, means to form a fastening having a shank or body with a taper on one side of its point and having a head with a downturned portion on the side of the shank opposite said taper, a driver to drive the fastening through the stock and force the downturned portion of the head into the stock and a horn or work-support to turn the tapered point of the shank backwardly into the stock toward the downturned portion of the head.

55. In a machine of the class described, means to form a fastening having a shank or body with a taper on one side of its point and having a head with a downturned portion on the side of the shank opposite said taper, means to form a bevel on one edge of the tapered point, a driver to drive the fastening through the stock and force the downturned portion of the head into the stock and a horn or work-support to turn the tapered point of the shank backwardly into the stock toward the downturned portion of the head.

56. In a machine for inserting metallic fastenings, wire-feeding mechanism, a wire-guideway, and an independent curver to bend the wire and thereby cause the production of a fastening with a curved shank or body.

57. In a machine for inserting metallic fastenings, wire-feeding mechanism, a wire-guideway, and an independent curver to curve the wire and thereby cause the production of a fastening with a curved shank or body, and means to adjust said curver to vary the curvature so imparted to the fastening.

58. In a machine for inserting metallic fastenings, a wire-guideway and a curver, adjacent to said wire-guideway, to bend the wire, said curver being adjustable to either side of the guideway so as to bend the wire in either direction as desired.

59. In a machine for inserting metallic fastenings, a wire-guideway, a curver having a wire passage, means to adjust said curver to one side of said wire-guideway and thereby impart a curvature to the wire and means to form and drive a fastening.

60. In a machine for inserting metallic fastenings, a wire-guideway, a curver to bend the wire before it enters said guideway, said curver having a wire passage, and means to adjust said curver to place its wire-passage at either side of the guideway so as to bend the wire in either direction.

61. A machine for forming from wire fastenings presenting each a shank and a head with a depending point, comprising wire-feeding mechanism to feed the wire for a variable distance preparatory to making each fastening, the distance depending upon the length desired for the shank of the fastening, and means to form the depending point of the head of the fastening of uniform length whatever the length of the shank.

62. A driver, a horn, means to move the horn that it may adapt its position to the thickness of the stock, and support and clamp the stock while a fastening is being driven into it by the driver, and means for forming from wire a fastening having a shank and a bent head presenting a depending point, the heads of successive fastenings being uniform but their shanks varying in length in accordance with the thickness of the stock then clamped by the horn.

63. In a machine for forming metallic fastenings, means to form a fastening having a shank or body and a head with a depending point shorter than the shank, a wire-guideway and an independent curver to curve the wire and cause the production of a fastening having a curved shank or body.

64. In a machine for forming metallic fastenings, means to form a fastening having a shank or body and a head with a depending point shorter than the shank, a curver to curve the wire and cause the production of a fastening having a curved shank or body, and means to vary the amount of the curvature imparted to the shank.

65. A pawl-carrier, a shoe-feeding mechanism, and wire-feeding mechanism, each deriving its movement from said pawl-carrier, and means to move said pawl-carrier.

66. A shoe-feeding wheel, a lever carrying it, a clutch to move the wheel in one direction, a rock-shaft, means to move said rock-shaft, connections between said shaft and clutch, and means to adjust said connection to vary the extent of movement of said feed-wheel.

67. A stock-feeding device represented as a wheel, a lever carrying said wheel, wire-feeding mechanism, a pawl-carrier, a pawl for actuating said wire-feeding mechanism, a shaft connected with and moved by said pawl-carrier, and connections between said shaft and said stock-feeding wheel to actuate the same intermittingly to feed the stock.

68. In a machine of the class described, a nose having a fastening-passage, wire-feeding mechanism, and means for forming from wire a fastening presenting a shank and a bent head having a depending point of a length less than the shank, a driver, means to actuate it to drive said fastening, and means to turn the point of the shank back into the stock forming a hook-shaped end for the fastening embedded in the stock.

69. In a machine of the class described, a driver, means to form a fastening having a shank or body and a head with a down-turned portion extending from the head at an acute angle to the shank, and means to hold said fastening with its shank in line with the path of the driver.

70. In a machine for producing metallic fastenings, an anvil presenting at one side a substantially vertical wall against which the shank of the fastening is formed, and at its opposite side a bevel, and a shaper and bender operating successively, the shaper forming the shank of the fastening, and the bender thereafter acting to bend the wire to form a loop-shaped head having a depending portion, the inner side of the depending portion being formed on the bevel of the anvil.

71. In a machine of the class described, a nose, a wire-guide having at its delivery end an anvil presenting a chamber at its rear side, the lower end of said chamber being inclined to present a positioning-surface, and a shaper and bender to form a fastening with a depending head and remove it from the anvil, combined with a driver to act on the fastening held between said shaper and bender, the said incline acting on one side of the depending head of the fastening if out of correct position to insure its proper entrance into the passage of the nose.

72. Means to caliper the stock from point to point where fastenings are to be inserted, means to form fastenings having uniform heads with depending points and shanks varying in length to accord with variations in the thickness of the stock, a driver to drive the fastenings and a clenching device to meet the points of the shanks and turn the said points back into the material.

73. A machine for forming from continuous wire a fastening having a shank or body and a head with a depending point shorter than the shank, comprising cutting means to form a tapered point on the wire, with a bevel on one edge of the tapered point, and means to bend the wire to form a shank with a tapered point and a head with a depending point.

74. In a machine of the class described, an anvil, a shaper and bender to bend a wire about said anvil and remove it from the anvil in the condition in which it was bent and prevent the expansion of the bent fastening, a nose having a driver-passage, and means to move said shaper and bender to put their inner faces in vertical alinement with the end walls of the passage in the nose.

75. In a machine of the class described, a wire-guideway, a nose or foot-plate, a driver, a horn, a wire-cutter, means for actuating it, and connections between said actuating means and said horn to raise the horn and clamp the stock, and to lower the horn for feeding.

76. A carriage, a connected wire-cutter, means to move said carriage, a horn, a lever extended from said carriage, and means intermediate said lever and said horn to reciprocate the horn as described.

77. In a machine for making fastenings from wire, a stationary cutter, a wire-guideway, a pivoted carriage having a movable wire-cutter, and means for actuating said carriage, said means as the said cutter meets the wire exerting its force to maintain the cutter in close contact with the stationary cutter member, and prevent said cutter from rising as it meets the wire.

78. A wire-guide, a pivoted carriage containing a cutter, means to move the carriage to enable the cutter to cut the wire, and a slide-bar in said carriage having an attached shaper and bender, and a toothed lever pivoted on said carriage, combined with means to actuate said lever and slide-bar, and means to move said carriage about its pivot.

79. A wire-guide, a carriage, and a slide-bar in said carriage having an attached shaper and bender, combined with a toothed lever pivoted on said carriage to engage said slide-bar, an eccentric stud extended from said lever and provided with a roller-stud, and a cam acting on said roller-stud.

80. A machine for securing together layers of material by means of fastenings each having a hook-shaped end to engage one side of the stock and a hook-shaped end to engage the other side of the stock with a single strand of wire connecting said ends; comprising means to form from continuous wire a fastening having a shank or body and having a head with a point depending from said head, said depending point being shorter than the shank, means to curve the shank portion of the fastening, means to drive said fastening into one side of the stock, insert the depending point of the head into that side of the stock and force the point of the shank entirely through the stock, and means to turn back the point of the shank into the opposite side of the stock.

81. A machine for securing together layers of material by means of fastenings each having a hook-shaped end to engage one side of the stock and a hook-shaped end to engage the other side of the stock with a single strand of wire connecting said ends; comprising means to form from continuous wire a fastening having a shank or body and having a head with a point depending from said head, said depending point being shorter than the shank, means to impart a double curvature to the shank portion of the fastening, means to drive said fastening into one side of the stock, insert the depending point of the head into that side of the stock and force the point of the shank entirely through the stock, and means to turn back the point of the shank into the opposite side of the stock.

82. A machine for securing together layers of material by means of fastenings each having a hook-shaped end to engage one side of the stock and a hook-shaped end to engage the other side of the stock with a single strand of wire connecting said ends; comprising means to form from continuous wire a fastening having a shank or body and having a head with a point depending from said head, said depending point being shorter than the shank, means to vary automatically the length of the shank according to the varying thickness of the stock, without varying the length of the depending point of the head, means to drive said fastening into one side of the stock, insert the depending point of the head into that side of the stock and force the point of the shank entirely through the stock, and means to turn back the point of the shank into the opposite side of the stock.

83. In a machine for producing fastenings, an anvil having a substantially horizontal top and having a bevel at one side extending from said top surface, combined with a shaper and a bender operating at different times, the bender being shaped to seat the wire against said bevel.

84. In a machine of the class described, a column, a head having a connected horn, and means to adjust said head and horn vertically in unison on said column to put the head in suitable position to adapt it to the requirements of the operator.

85. In a machine of the class described, a column having a vertically-grooved portion, a head having a projecting portion shaped to enter said groove and adjustable vertically in said groove, a work-support, an arm on said head to carry said work-support, and means to secure said head in said groove.

86. In a machine of the class described, a column having a vertically-grooved portion, a head having a projection shaped to enter said groove, and suitable raised portions to form bearings.

87. In a machine of the class described, a column having a substantially V-shaped vertical groove, a head having a projection shaped to enter said groove and suitable raised portions whereby said column and said head are made to take bearing at three points only.

88. A driver-bar, a collar on said driver-bar, an actuating-lever, a connection between said lever and said driver-bar and a connection between said lever and said collar, whereby the driver-bar is actuated by said lever in both directions.

89. In a machine for inserting fastenings, a driver-bar, a collar loose on said driver-bar, an actuating-lever, means connecting said collar and said lever wherethrough the driver-bar is lifted by said lever, and independent means connecting the lever and the driver-bar wherethrough the driver-bar is depressed by said lever.

90. A driver-bar, actuating means therefor, a cushion to deaden the blow of the driver-bar, a bushing in said cushion and a collar on said driver-bar, said collar being so fitted to said driver-bar as to leave an opening to receive such part of the bushing as may protrude above the cushion.

91. In a machine of the class described, a driver-bar, a cushion to deaden the blow of the driver-bar, and a bushing for the driver-bar extending through said cushion and also through a portion of the frame of the machine.

92. In a machine of the class described, a driver-bar, a cushion to deaden the blow of the driver-bar and a bushing extending through said cushion and also into or through a portion of the frame, said bushing being constructed to hold the cushion in position and also to form a bearing for the driver.

93. In a machine for inserting metallic fastenings, a driver, a horn and means to support said horn whereby, as the horn is moved downward, the tip of the horn is moved away from the line of movement of the driver.

94. A machine for inserting metallic fastenings having a shank or body and a hook-shaped head, comprising a nose-plate, a horn and means to support the horn whereby, as the driver is moved downward from the nose-plate, it is moved away from the line of movement of the driver in a substantially straight line at an angle to the said line of movement of the driver.

95. A machine for inserting metallic fastenings having a shank or body and a head with a depending point shorter than the shank and extending at an angle from the shank, comprising a driver, actuating means therefor, and means to hold said fastening in vertical position under said driver and to maintain its vertical position while it is being driven.

96. A machine for inserting metallic fastenings having a shank or body and a head with a depending point shorter than the shank and extending at an angle from the shank comprising a driver, and a nose-plate having a driver-passage formed to slightly compress the two parts of the fastening together, thereby enabling the driver-passage to maintain the fastening in vertical position.

97. In a machine for inserting metallic fastenings, means to form from continuous wire a fastening having a shank or body, and a head with a downturned portion shorter than the shank extending from the head at an acute angle to the shank, a driver and means to guide the fastening while it is being driven, said means being adapted to compress the two parts of the fastening together and so hold the fastening in vertical position.

98. Means to form from continuous wire a fastening having a shank or body and a head with a downturned portion shorter than the shank extending from the head at an acute angle to the shank, a driver and a nose-plate having a driver-passage shaped to compress the fastening while being driven, whereby the downturned portion of the head and the shank are forced against the walls of the driver-passage, and the fastening is guided while being driven.

99. Means to form the shank or body of a fastening, means to sever the fastening from the wire, means to bend a portion of the fastening to form a head with a downturned portion projecting at an acute angle from the shank, and a nose or foot plate having a driver-passage shaped to compress the fastening, whereby said fastening, as it is being driven, is held in proper vertical position.

100. In a machine of the class described, a wire-guide, means for curving the end of the wire delivered from said guide, a nose to receive a fastening formed from said wire, means coöperating with said wire to bend it at its end to form therefrom a fastening and feed said fastening in position over the opening in said nose, and a suitable driver to drive the fastening into and through said nose.

101. A wire-guide, a coöperating anvil, and wire-cutting mechanism, combined with a shaping device and a bender, and means to actuate the same whereby the shaping device coöperates with the wire at the delivery end of the wire-guide to bend the same to form the shank of the fastening after which the cutting mechanism operates to sever the wire and form a blank, the shaping device moving the wire blank over the anvil, the further descent of the shaping device causing the bender to act on the wire blank held by the shaping device on the anvil and further bend it to form a fastening.

102. A wire-guide, a carriage having a wire-cutting blade presenting an inclined beveled edge to make a shear cut, a shaper, and a bender having its rear edge beveled to aline the same with the incline of said cutter.

103. In a machine for inserting metallic fastenings formed from continuous wire, means to form a fastening having a head with a depending point extending from the head at an acute angle to the shank, a foot-plate having a passage shaped to maintain the depending head of each fastening in the same position with relation to the shank, and means to guide the fastening into said passage.

104. A wire-guide, a carriage having a wire-cutting blade presenting an inclined beveled edge to make a shear cut, a shaper, and a bender having its rear edge beveled to aline the same with the incline of said cutter, and an anvil having at its inner side a chamber, the upper end of which next the wire-passage of the wire-guideway is also inclined to correspond with the inclination of the cutter, said cutter pushing the short end of the wire severed from the wire in the guideway in front of it until the inclined end of the cutter is in alinement with the incline of the wall of the chamber when the bender in its descending movement acting on the short end of the wire resting against the cutter bends the same into said chamber and over the anvil.

105. A nose having a driver-passage and presenting at its upper end at one side of said driver-passage a plate, and an anvil having its end opposed to and parallel with the face of said plate, said end of the anvil being placed near said plate to leave a space between the plate and anvil, and means to close the sides of said space periodically to form an auxiliary passage for a fastening.

106. A nose having a driver-passage and presenting at its upper end at one side said driver-passage a plate, and an anvil having its end opposed to and parallel with the face of said plate, said end of the anvil being located near said plate to leave a space between the plate and anvil sufficient for the passage of a fastening, and a shaper and bender, the inner faces of which cross the front and rear sides of said space to form an auxiliary passage in which the formed fastening is delivered from the end of the anvil.

107. A wire-guide presenting at its delivery end means to curve the wire being delivered from the wire-guide, means to bend said wire in a curved part thereof to form the shank of a fastening, and means to cut said wire in a curved part thereof and to further bend the wire to form a head for the fastening, said head presenting a downturned outwardly-curved point.

108. A shoe-feeding wheel, a support for the same, and a threaded stud; combined with a nut applied to said threaded stud, and a positioning device presenting cam-grades and movable between said nut and support.

109. A pivoted support carrying a rotatable shoe-feeding wheel, a pivoted threaded rod coöperating with said support, and a device upon which said pivoted rod is mounted; combined with a nut coöperating with the thread of said rod, and a positioning device having cam-grades and interposed between said nut and the feeding-wheel support.

110. A feeding-wheel support having a hub, said support having pivotally mounted upon it a feeding-wheel, a rod extended through said support, and a coöperating positioning device rotatable about said rod, the end of the hub and the side of the positioning device presenting suitable cam-grades, whereby by rotation of the positioning device a change of position may be effected of the support and the acting edge of the feeding-wheel.

111. A feeding-wheel support, a feed-wheel carried thereby, a threaded rod, a nut applied to said rod, said nut having a sleeve, a positioning device mounted on said sleeve and presenting cam-grades, and a locking pin or projection interposed between the nut and the positioning device whereby the relative position of the positioning device on the sleeve of the nut may be changed for fine adjustments.

112. In a machine of the class described, an anvil having its delivery end slightly larger in cross-section than a part of the anvil back of said delivery end whereby said anvil is adapted to act frictionally to prevent the accidental escape of the fastening therefrom.

113. In a machine for forming metallic fastenings from continuous wire, an anvil having its delivery end slightly larger than the portion of the anvil over which the wire is bent, combined with means to bend the wire over the anvil, said larger end preventing the accidental escape of the bent fastening from the anvil.

114. A driver, an anvil, means to form a fastening thereon presenting a curved shank and a depending head having a point directed away from said shank, a fastening-passage oblong in cross-section, the greatest measurement of the passage in cross-section being less than the measurement of a cross-section of the fastening at the end of the point depending from the head, whereby the depending point and the shank of the said fastening while being driven through the nose are kept frictionally in contact with the walls of the nose at opposite points, the body and head of said fastening being thereby guided accurately while the fastening is being driven from the nose into the stock.

115. A guideway for fastenings, a plate forming one wall of said guideway, means to hold said plate frictionally in position with its outer face in line with the vertical delivery end of said guideway, said plate being free to slide under excessive pressure applied to its face over which the driver acts.

116. In a machine of the class described, a bender, a shaper, and an anvil forming three sides of an auxiliary passage, a block having a plate movably secured to it, the end of said plate forming the fourth side of said passage, a driver, and means to move said shaper and bender toward the end of said plate, the latter yielding to any excess of pressure applied to it over that which the said plate should stand in the operation of the machine.

117. In a machine of the class described, a wire-guideway, an anvil, a shaper and a bender, a detachable slotted plate sustained by a set-screw screwed into a suitable block or device forming part of the machine, and a driver movable in the space between the ends of said plate and anvil, the removal of said plate affording access to the said driver.

118. A machine for making and setting a fastening device consisting of a single strand of wire constituting the shank of the fastening having at each end a hook embedded in the material to be fastened, comprising means for feeding the wire, means for bending the wire at the point of union of the shank portion of the fastening and one of the hooked ends, means for severing the fastening, means for shaping one end of the fastening into a hook form, means for driving the shank and hook of the fastening and for guiding them during the operation of driving, and means for clenching the penetrating point of the shank of the fastening into the material in hook form.

119. A machine for making and setting a fastening device consisting of a single strand of wire constituting the shank of the fastening having at each end a hook embedded in the material to be fastened, comprising means for feeding the wire, means for bending the wire at the point of union of the shank portion of the fastening and one of the hooked ends, means for severing the fastening, means for shaping one end of the fastening into a hook form, means for automatically varying the length of the shank of the fastening according to the thickness of the stock, means for driving the shank and hook of the fastening and for guiding them during the operation of driving, and means for clenching the penetrating point of the shank of the fastening into the material in hook form.

120. A machine for making and setting a fastening device consisting of a single strand of wire constituting the shank of the fastening having at each end a hook embedded in the material to be fastened, comprising means for feeding the wire, means for bending the wire at the point of union of the shank portion of the fastening and one of the hooked ends, means for severing the fastening, means for shaping one end of the fastening into a hook form, means for automatically varying the length of the shank of the fastening according to the thickness of the stock without changing the length or shape of the hooked end of the fastening, means for driving the shank and hook of the fastening and for guiding them during the operation of driving, and means for clenching the penetrating point of the shank of the fastening into the material in hook form.

121. A machine for making and setting a fastening device consisting of a single strand of wire constituting the shank of the fastening having at each end a hook embedded in the material to be fastened, comprising means for feeding the wire, means for bending the wire at the point of union of the shank portion of the fastening and one of the hooked ends, means for curving the shank portion of the fastening, means for severing the fastening, means for shaping one end of the fastening into a hook form, means for driving the shank and hook of the fastening and for guiding them during the operation of driving, and means for clenching the penetrating point of the shank of the fastening into the material in hook form.

122. A machine for making and setting a fastening device consisting of a single strand of wire constituting the shank of the fastening having at each end a hook embedded in the material to be fastened, comprising means for feeding the wire, means for bending the wire at the point of union of the shank portion of the fastening and one of the hooked ends, means for imparting a double curvature to the shank portion of the fastening, means for severing the fastening, means for shaping one end of the fastening into a hook form, means for driving the shank and hook of the fastening and for guiding them during the operation of driving, and means for clenching the penetrating point of the shank of the fastening into the material in hook form.

123. In a machine of the class described, a wire-guideway shaped near its end to curve the end of the wire projected beyond said end, said guideway being cut away to expose the wire leaving the guideway that the wire may be removed in the production of a blank for a fastening, means for bending the wire projected beyond the end of the guideway to define the head and the length of the shank or body of the fastening, wire-cutting means to sever the bent wire diagonally thus producing a tapered head-forming portion for the fastening and means to thereafter bend said tapered head-forming portion to make for the fastening a head having a downturned tapered point.

124. In a machine of the class described, shaping means to define the bend for the head of a fastening and determine the length of the shank or body thereof, cutting mechanism to sever the wire diagonally close to the bend made therein in defining the head to leave a tapered head-forming portion, and a bender acting against said tapered head-forming portion to complete the head and provide for it a depending point.

125. In a machine of the class described, a block presenting at one end a shaping-surface, the upper side of the block having a stationary cutter the edge of which terminates short of the face of the said shaping-surface.

126. In a machine for inserting metallic fastenings, means for feeding and corrugating the wire, means for bending the wire to form a fastening having a shank and a hook-shaped head, means to drive the fastening and embed the hook-shaped head in one side of the stock and means to turn back and embed the point of the shank in the other side of the stock.

In testimony whereof I have signed my name to this specification in the presence of two subscribing witnesses.

LOUIS A. CASGRAIN.

Witnesses:
GEO. W. GREGORY,
MARGARET A. DUNN.